US011961664B2

(12) United States Patent
Kashikhin

(10) Patent No.: US 11,961,664 B2
(45) Date of Patent: Apr. 16, 2024

(54) HIGH TEMPERATURE SUPERCONDUCTING MAGNET

(71) Applicant: FERMI RESEARCH ALLIANCE, LLC, Batavia, IL (US)

(72) Inventor: Vladimir Kashikhin, Aurora, IL (US)

(73) Assignee: Fermi Research Alliance, LLC, Batavia, IL (US)

( * ) Notice: Subject to any disclaimer, the term of this patent is extended or adjusted under 35 U.S.C. 154(b) by 0 days.

(21) Appl. No.: 17/389,252

(22) Filed: Jul. 29, 2021

(65) Prior Publication Data

US 2022/0037069 A1 Feb. 3, 2022

Related U.S. Application Data

(60) Provisional application No. 63/059,680, filed on Jul. 31, 2020.

(51) Int. Cl.

*H01F 6/06* (2006.01)
*H01F 6/00* (2006.01)
*H01F 41/04* (2006.01)
*H01F 6/04* (2006.01)

(52) U.S. Cl.

CPC ............... *H01F 6/06* (2013.01); *H01F 6/005* (2013.01); *H01F 41/048* (2013.01); *H01F 6/04* (2013.01)

(58) Field of Classification Search

CPC .......... H01F 6/06; H01F 6/005; H01F 41/048; H01F 6/04; H05H 7/04
USPC .......................................................... 335/216
See application file for complete search history.

(56) References Cited

U.S. PATENT DOCUMENTS

| | | | | |
|---|---|---|---|---|
| 3,939,441 | A * | 2/1976 | Menzel | H04B 15/00 333/167 |
| 4,652,772 | A * | 3/1987 | Shephard | H01B 7/0838 174/117 FF |
| 4,999,600 | A | 3/1991 | Aubert | |
| 6,545,474 | B2 | 4/2003 | Nakamura et al. | |
| 7,026,901 | B2 | 4/2006 | Yanagi et al. | |
| 7,498,915 | B1 | 3/2009 | Leupold | |
| 8,712,489 | B2 | 4/2014 | Schauwecker et al. | |
| 9,620,273 | B2 | 4/2017 | Kasten | |
| 2006/0025265 | A1 | 2/2006 | Oka et al. | |

(Continued)

FOREIGN PATENT DOCUMENTS

| | | | |
|---|---|---|---|
| DE | 102010042598 | A1 | 4/2012 |
| WO | 2007004787 | A2 | 1/2007 |

OTHER PUBLICATIONS

Kashikhin, Vladimir, et al., "High Temperature Superconducting Quadrupole Magnets with Circular Coils", IEEE Trans. on Applied Superconductivity, 2019, vol. 29, Issue 5, 4002404, 4 pages.

(Continued)

*Primary Examiner* — Shawki S Ismail
*Assistant Examiner* — Lisa N Homza
(74) *Attorney, Agent, or Firm* — LOZA & LOZA, LLP; Kevin L. Soules

(57) ABSTRACT

Systems and methods for superconducting magnets are disclosed, such systems and methods comprising a primary coil and short-circuited secondary coil. The secondary coil can be made from a stack of superconducting tapes having longitudinal cuts forming closed superconductor loops without splices. The primary coil is used to pump the current into the secondary coil where it circulates continuously generating a permanent magnetic field.

9 Claims, 18 Drawing Sheets

(56) References Cited

U.S. PATENT DOCUMENTS

| | | | | |
|---|---|---|---|---|
| 2016/0064127 | A1* | 3/2016 | Kuhnert | H01F 6/06 335/216 |
| 2016/0064128 | A1* | 3/2016 | Kummeth | H01F 7/0205 505/211 |
| 2017/0084371 | A1* | 3/2017 | Batz | H01F 41/12 |
| 2017/0117095 | A1* | 4/2017 | Batz | H01F 41/048 |
| 2020/0211744 | A1* | 7/2020 | Labombard | H01F 6/02 |

OTHER PUBLICATIONS

Kosa, J., et al., "Application Possibilities with Continuous YBCO Loops Made of HTS Wire", Journal of Physics: Conference Series 234 (2010) 032030, 13 pages.

* cited by examiner

HIGH TEMPERATURE SUPERCONDUCTING MAGNET

CROSS REFERENCE TO RELATED PATENT APPLICATIONS

This patent application claims the priority and benefit, under 35 U.S.C. § 119(e), of U.S. Provisional Patent Application Ser. No. 63/059,680, filed Jul. 31, 2020, and titled "HIGH TEMPERATURE SUPERCONDUCTING MAGNET". U.S. Provisional Application Ser. No. 63/059,680 is incorporated herein by reference in its entirety.

STATEMENT OF GOVERNMENT RIGHTS

The invention described in this patent application was made with Government support under the Fermi Research Alliance, LLC, Contract Number DE-AC02-07CH11359 awarded by the U.S. Department of Energy. The Government has certain rights in the invention.

TECHNICAL FIELD

Embodiments disclosed herein are related to magnets. The embodiments disclosed herein are further related to superconductors. The embodiments are also related to persistent electromagnets configured using superconductors. The embodiments are also related to methods and systems associated with magnet and coil configurations using a tape type conductor, which is assembled from a stack of conductors having a longitudinal cut forming closed superconductor loops without splices. The current induced in the coil generates a stable magnetic field with extremely limited decay.

BACKGROUND

Electromagnets are well known, and find applications in a vast array of technological fields. One subset of electromagnets which show increasing applicability are electromagnets that make use of superconductors to induce the desired magnetic fields. While these types of magnets have been used to great success in certain applications, major as yet unaddressed problems remain in the art.

While there has been substantial progress in the fabrication of high temperature superconductors (HTS) which can be used for such applications, the time constant of the superconducting current decay is defined by the relation of coil inductance to the short-circuited loop resistance. There remain significant issues with such technologies which are difficult to resolve.

For example, it is difficult to make superconducting splices between conductors, and the quench propagation velocity in certain superconductors makes them susceptible to overheating which can damage the superconductor. Quench detection and HTS coil protection systems are complicated. Furthermore, multi-turn coil performance is limited by the superconductor properties along the superconductor length. Even small defects or errors during the winding of brittle conductors can irreparably damage the coil.

Accordingly, there is a need in the art for improved methods, systems, and apparatuses for persistent superconductor electromagnets as disclosed herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for creating magnets.

It is another aspect of the disclosed embodiments to provide a method and system for producing electromagnets.

It is another aspect of the disclosed embodiments to provide methods, systems, and apparatuses for generating persistent or semi-persistent superconductor magnets at low risk of quenching.

It is another aspect of the disclosed embodiments to provide methods, systems, and apparatuses for manufacturing HTS electromagnets for application in particle accelerators.

The aforementioned aspects and other objectives and advantages can now be achieved as described herein. For example, in an embodiment, a system as disclosed herein can comprise a first conductor configured in a strip with a longitudinal cut along a portion of the first conductor; at least one second conductor configured in a strip with a longitudinal cut along a portion of the second conductor; wherein the first conductor and the at least one second conductor are arranged in a stack and a first end of the first conductor is shorted to a first end of the at least one second conductor and a second end of the first conductor is shorted to a second end of the at least one second conductor thereby forming a closed loop. In an embodiment of the system, the at least one second conductor comprises a plurality of conductors. In an embodiment of the system, the first conductor and the at least one second conductor comprise tape type conductors. In an embodiment of the system, the first conductor and the at least one second conductor comprise superconductors. In an embodiment of the system, the first conductor and the at least one second conductor comprise HTS tape type conductors. In an embodiment of the system, the longitudinal cut along the first superconductor is configured to be the length of a half coil perimeter; and the length of the longitudinal cut along the second superconductor is configured to the length of a half coil perimeter. In an embodiment of the system, the stack of the first conductor and the at least one second conductor is impregnated with epoxy. In an embodiment, the system further comprises a ferromagnetic yoke wherein the closed loop is mounted in the ferromagnetic yoke. In an embodiment, the system comprises a primary conducting coil and a support structure configured to mount the primary coil and the closed loop.

In another embodiment, a method of manufacturing a magnet comprises cutting a longitudinal slit in at least two conductors, wherein the slit is formed along a portion of each of the at least two conductors, but does not extend to the ends of the at least two conductors, assembling the at least two conductors into a stack of conductors, shorting a first end of the at least two conductors, shorting a second end of the at least two conductors, and forming a coil from the stack of at least two conductors. In an embodiment, the method of manufacturing a magnet further comprises forming a coil support structure. In an embodiment, the method of manufacturing a magnet further comprises cutting a longitudinal slit in at least two conductors further comprises selecting the cut length according to a desired half coil perimeter. In an embodiment, the method of manufacturing a magnet further comprises shorting the first end of the at least two conductors comprises at least one of soldering the first end together and sintering the first end together; and wherein shorting the second end of the at least two conductors comprises at least one of soldering the first end together and sintering the first end together. In an embodiment, the method of manufacturing a magnet further comprises wrapping a heater wire around the coil. In an embodiment, the method of manufacturing a magnet further comprises wrapping a Rogowski coil around the coil. In an embodiment, the method of manufacturing a magnet further comprises assembling a secondary coil configured as a magnetic field stabilization coil.

In another embodiment, a superconducting magnet system comprises a first conductor configured in a strip with a longitudinal cut along a portion of the first conductor, at least one second conductor configured in a strip with a longitudinal cut along a portion of the second conductor, wherein the first conductor and the at least one second conductor are arranged in a stack and a first end of the first conductor is shorted to a first end of the at least one second conductor and a second end of the first conductor is shorted to a second end of the at least one second conductor thereby forming a closed loop, a secondary coil, and a yoke configured in spaced relation with the stack of the first conductor and the second conductor. In an embodiment of the superconducting magnet system the at least one second conductor comprises a plurality of conductors. In an embodiment of the superconducting magnet system the first conductor and the at least one second conductor comprise tape type conductors. In an embodiment of the superconducting magnet system the first conductor and the at least one second conductor comprise superconductors.

Various additional embodiments and descriptions are provided herein.

BRIEF DESCRIPTION OF THE DRAWINGS

The accompanying figures, in which like reference numerals refer to identical or functionally similar elements throughout the separate views and which are incorporated in and form a part of the specification, further illustrate the embodiments and, together with the detailed description, serve to explain the embodiments disclosed herein.

DETAILED DESCRIPTION

Figure 1:
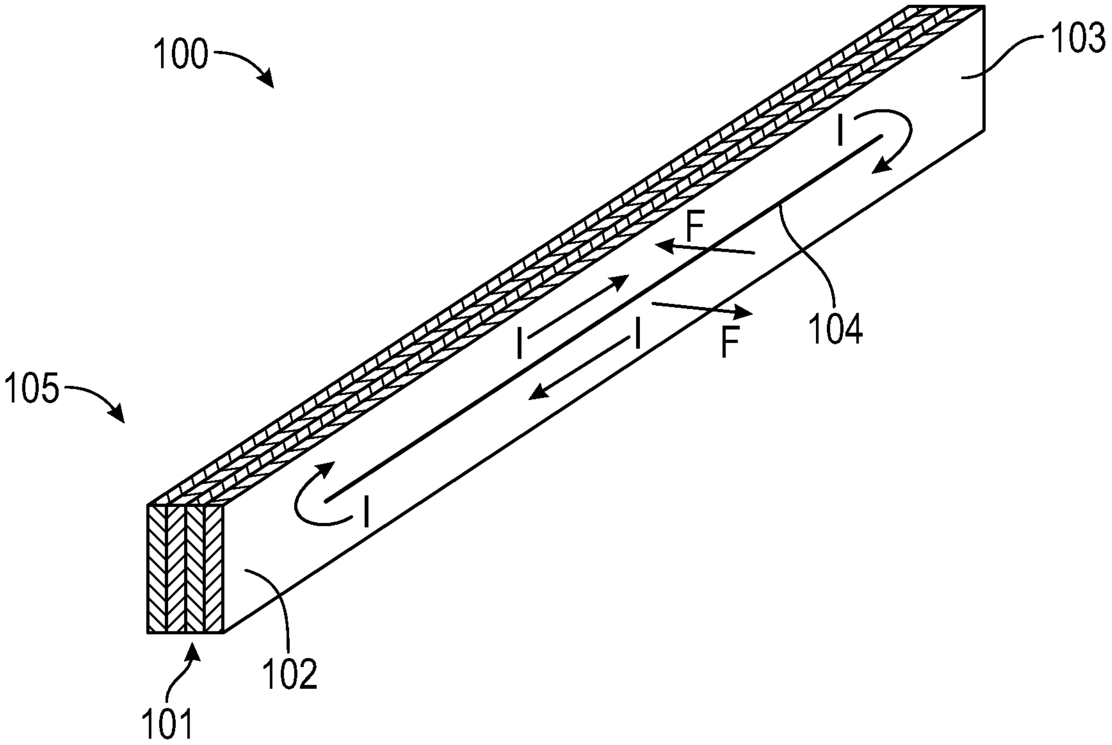
FIG. 1 depicts a schematic view of superconductor stack having a longitudinal cut, in accordance with the disclosed embodiments.

The particular values and configurations discussed in the following non-limiting examples can be varied and are cited merely to illustrate one or more embodiments and are not intended to limit the scope thereof.

Example embodiments will now be described more fully hereinafter, with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms “a”, “an”, and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. Dimensions or ranges illustrated in the figures are exemplary, and other dimensions can be used in other embodiments. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope and concept of the invention as defined by the appended claims.

LIST OF ACRONYMS

I current
F force to form the coil
MPS primary power supply
HPS heater power supply
SWp primary circuit switch
SWh heater circuit switch The methods and systems disclosed herein are directed to superconducting magnets comprising a primary coil and short-circuited secondary coil. The secondary coil can be made from a stack of superconducting tapes having longitudinal cuts extending along the tape, but not to both ends of the tape, forming closed superconductor loops without splices. A primary coil is used to pump current into the secondary coil where it circulates continuously, generating a permanent magnetic field even after the power source is disconnected.

In certain embodiments, the disclosed approach includes the use of a stack of superconducting loops working in parallel without splices and an electrical insulation between them to generate the stable magnetic field. The stack of superconducting loops can be bent as necessary to form a solenoidal, multipole magnetic field, or the like. These coils can be mounted inside a ferromagnetic magnet core where the magnetic field is formed and directed by magnetic poles.

FIG. 1 illustrates a coil 100 assembled from a stack of conductors 101 in accordance with the disclosed embodiments. The stack of conductors 101 have a longitudinal cut 104, but the cut 104 does not extend through the conductor ends 102, or conductor ends 103. The number of conductors in the stack of conductors 101 can be selected according to design considerations. Four conductors are shown in the stack of conductors 101 in FIG. 1. The ends of each respective conductor can be shorted to the adjacent conductors via various techniques.

Figure 2:
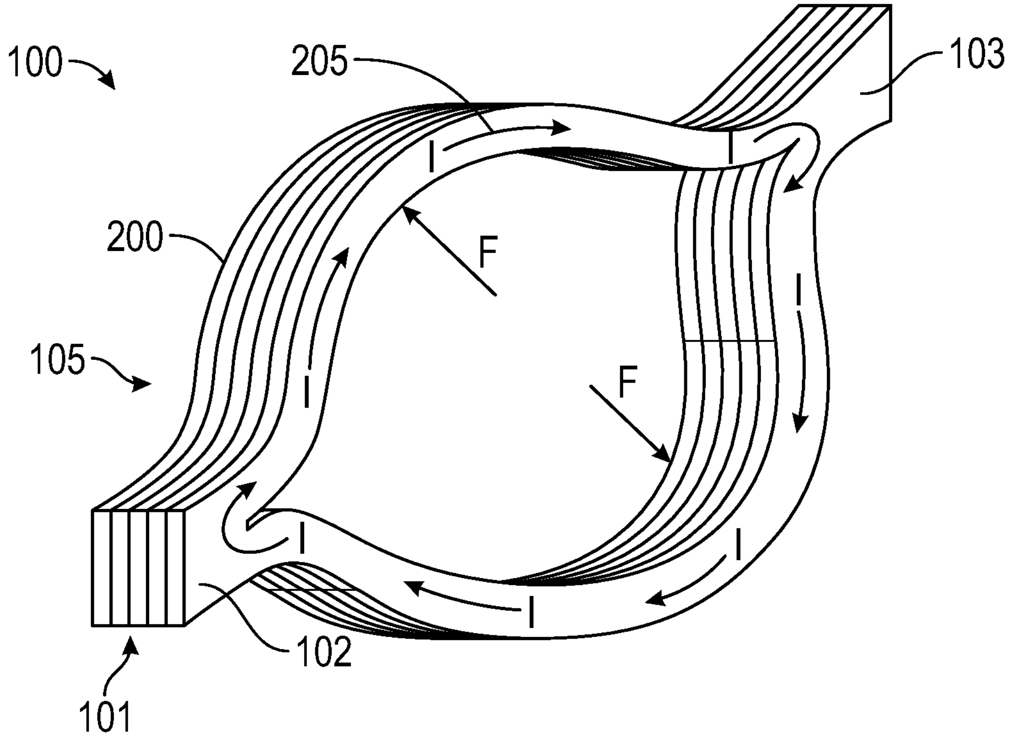
FIG. 2 depicts a schematic view of a closed loop coil according to the methods and systems disclosed herein.

The stack of conductors 101 illustrated in FIG. 1 can be configured to be bent into various shapes. For example, FIG. 2 illustrates the coil 100 bent into a desired loop configuration 200. The loops shown in FIGS. 1 and 2 can form a coil 105. The short-circuited tape type loop configurations 200 are shown in FIG. 2. In this embodiment, all the loops are fully transposed relative to external magnetic flux. This efficient transposition provides identical current 205 generation in loops during the external magnetic flux variations. Because there is no electrical insulation between loops their surfaces have good thermal contact through the copper stabilizer which provides fast heat wave propagation in the transverse direction. In this way the coil is self-protected because the stored energy is evenly distributed in the coil volume.

Figure 3:
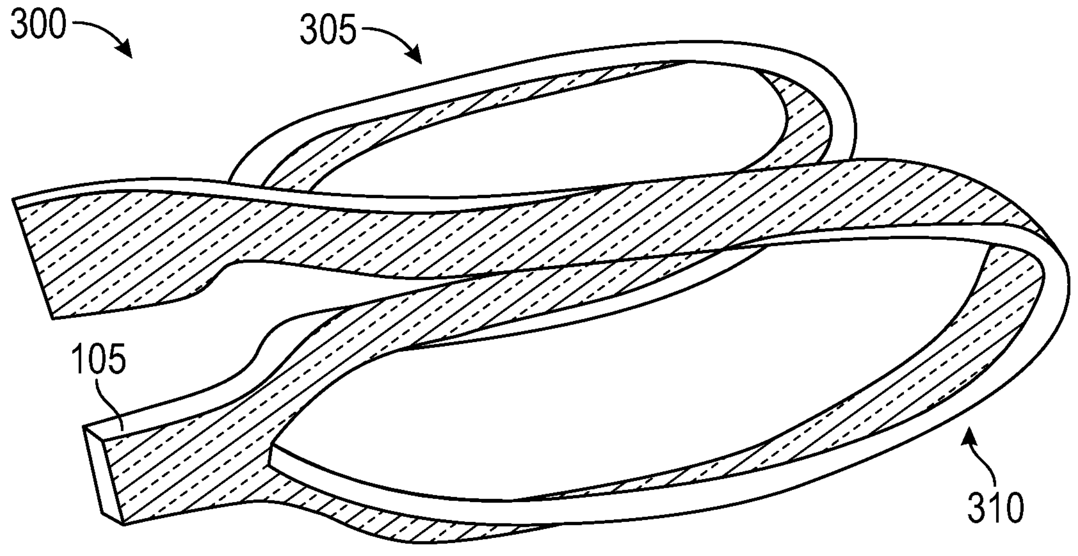
FIG. 3 depicts a schematic view of a closed loop coil assembly from the stack of conductors after forming the coil quadrupole configuration, in accordance with the disclosed embodiments.

FIG. 3 schematically shows a quadrupole coil geometry 300 formed from a stack of superconductor loops 101. In this configuration, multiple larger loops 305 and 310 are formed from the superconductor loops 101.

Figure 4:
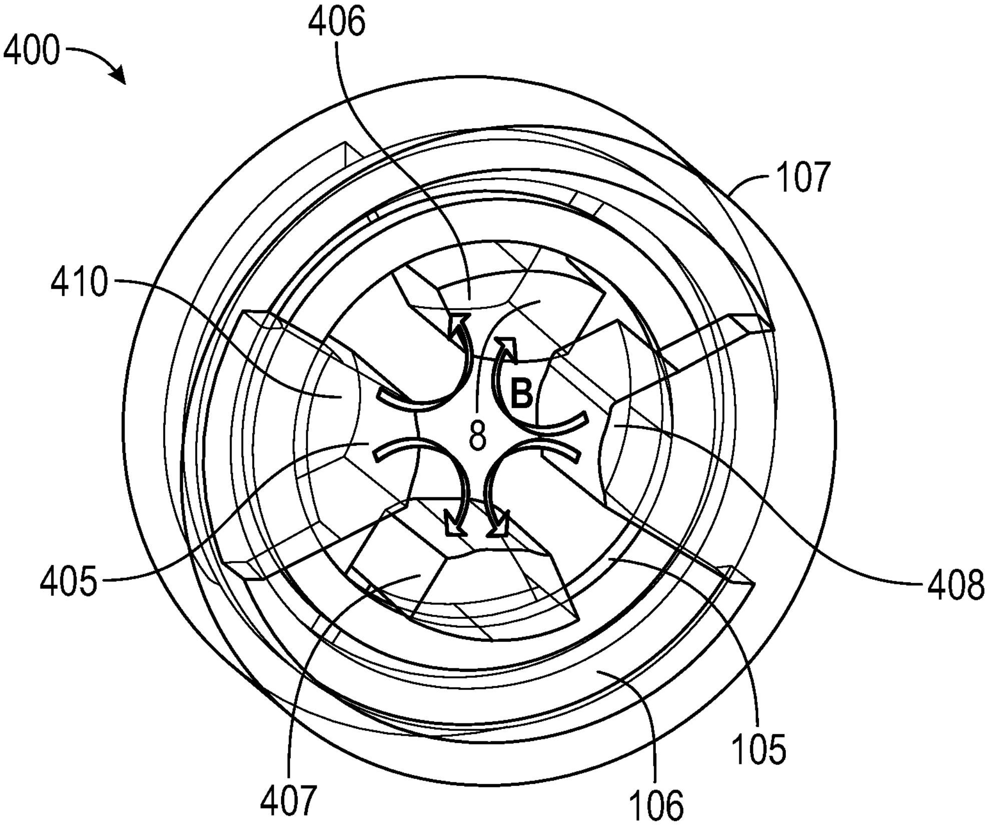
FIG. 4 depicts a quadrupole magnet, in accordance with the disclosed embodiments.

FIG. 4 illustrates a quadrupole magnet assembly 400 having the secondary superconducting coil 105 and the primary coil 106 which can be superconducting or non-superconducting. Both superconducting coil 105 and primary coil 106 can be mounted inside the ferromagnetic yoke 107 having four poles 405-408 to form a quadrupole magnetic field 410. In certain embodiments, this could be configured as a dipole, quadrupole, sextupole, and/or other multipole field. The short-circuited coils can be arranged to create the dipole field as shown in FIG. 4.

Figure 5A:
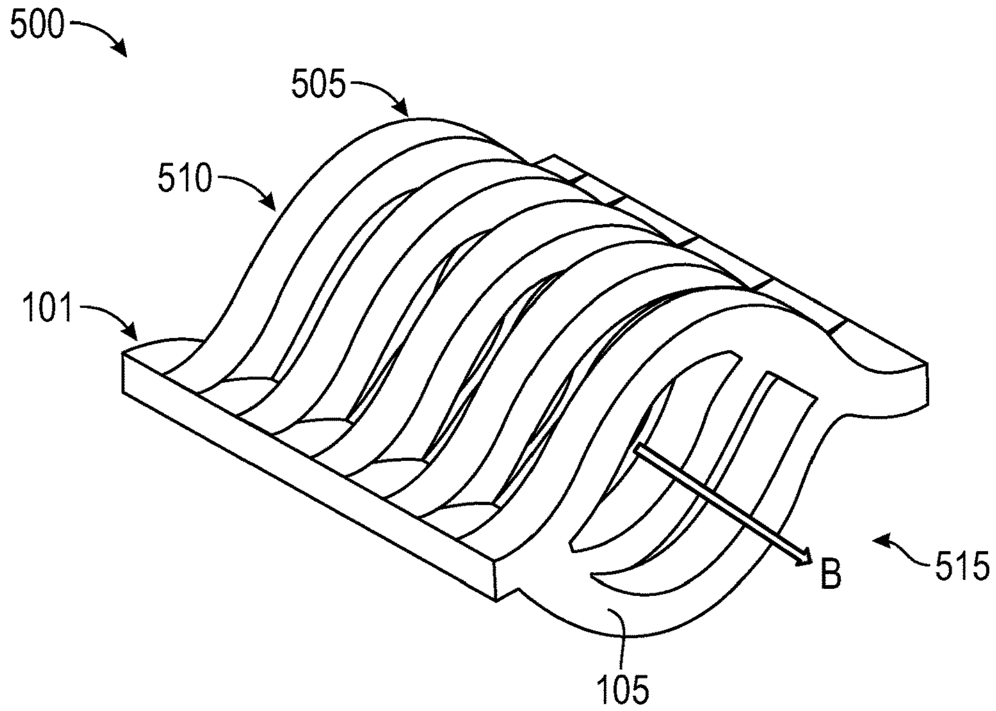
FIG. 5A depicts a solenoidal coil configuration, in accordance with the disclosed embodiments.
Figure 5B:
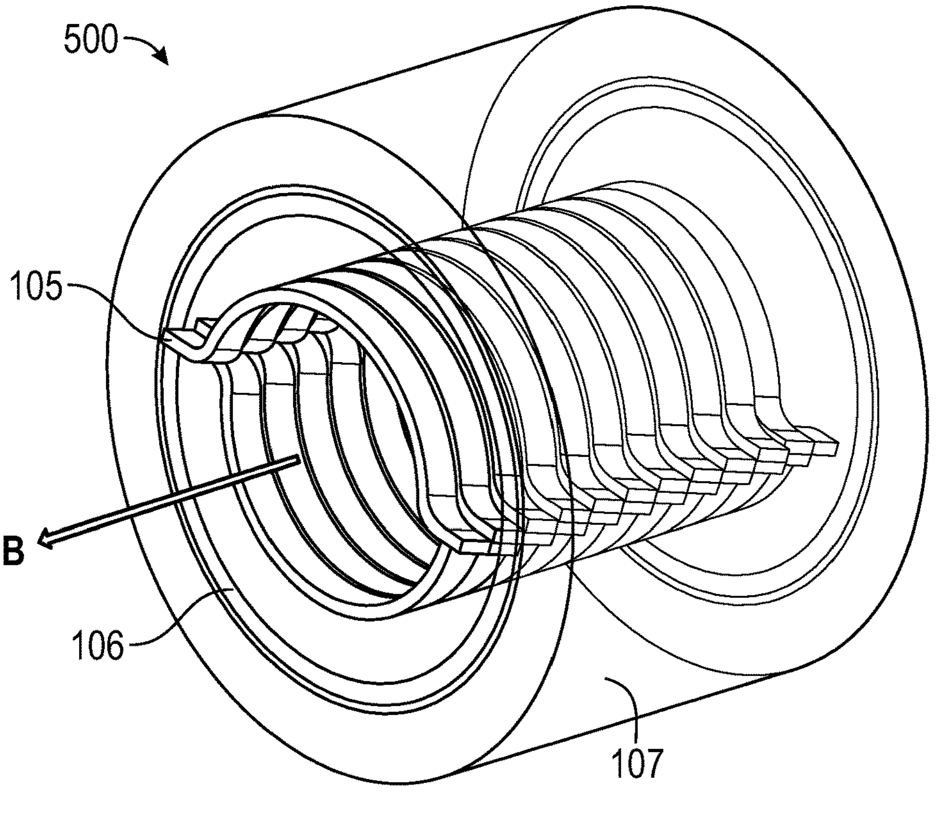
FIG. 5B depicts a solenoidal coil configuration, in accordance with the disclosed embodiments.

FIGS. 5A and 5B illustrate another embodiment of a solenoidal magnet assembly 500. In this embodiment, the stack of conductors 101, including superconductor 105 can be configured as interspaced ribs 505 configured to create a central void 510 along the axis extending through, and between the ribs 505. As illustrated the solenoidal magnet assembly can be used to create a magnetic field 515 along the axis extending through and between the ribs 505. As illustrated in FIG. 5B, the system can comprise a primary coil 106 and a ferromagnetic yoke 107, magnetically coupling the primary coil 106 with a secondary coil 105.

Figure 6A:
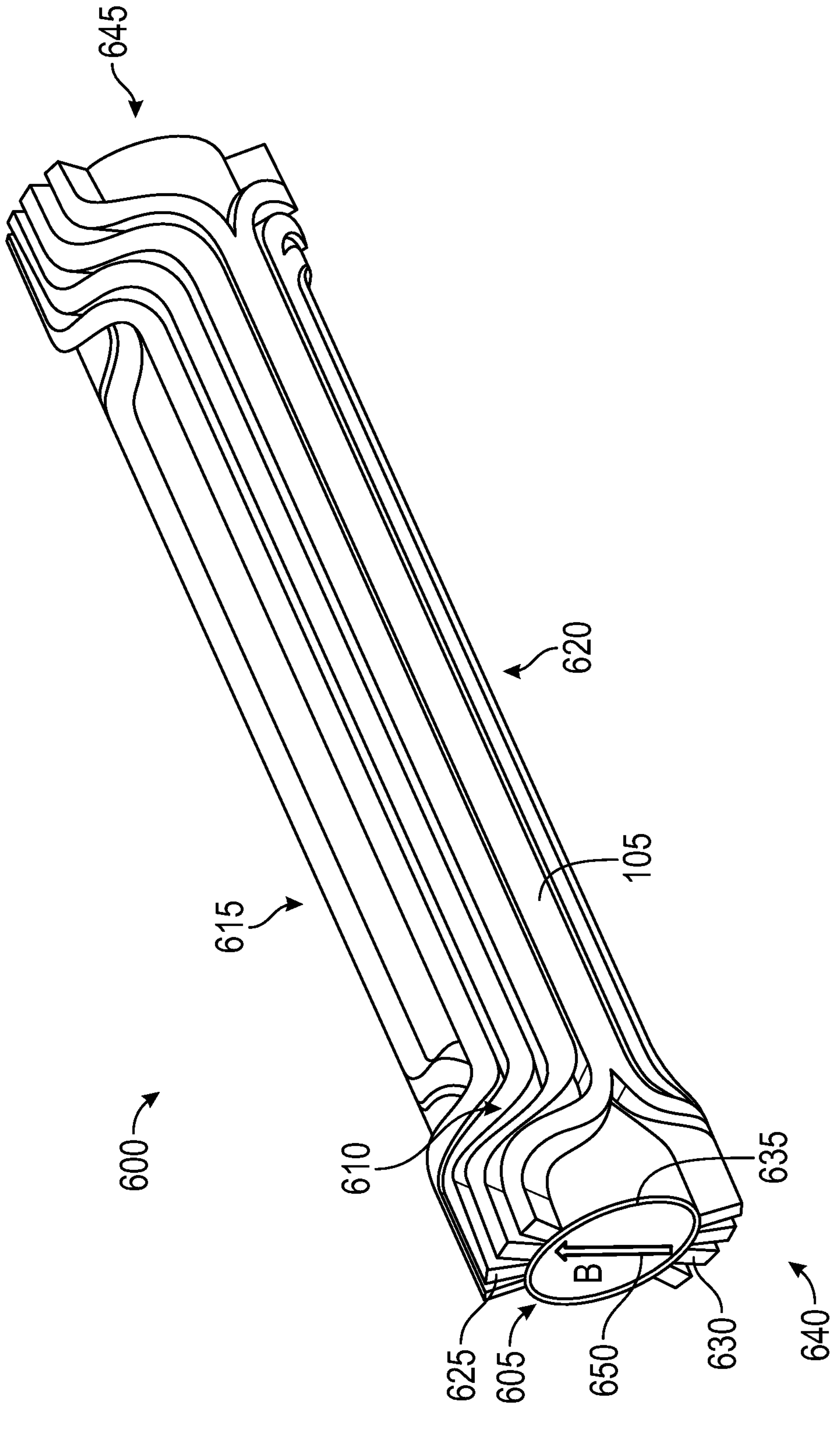
FIG. 6A depicts a dipole coil configuration, in accordance with the disclosed embodiments.
Figure 6B:
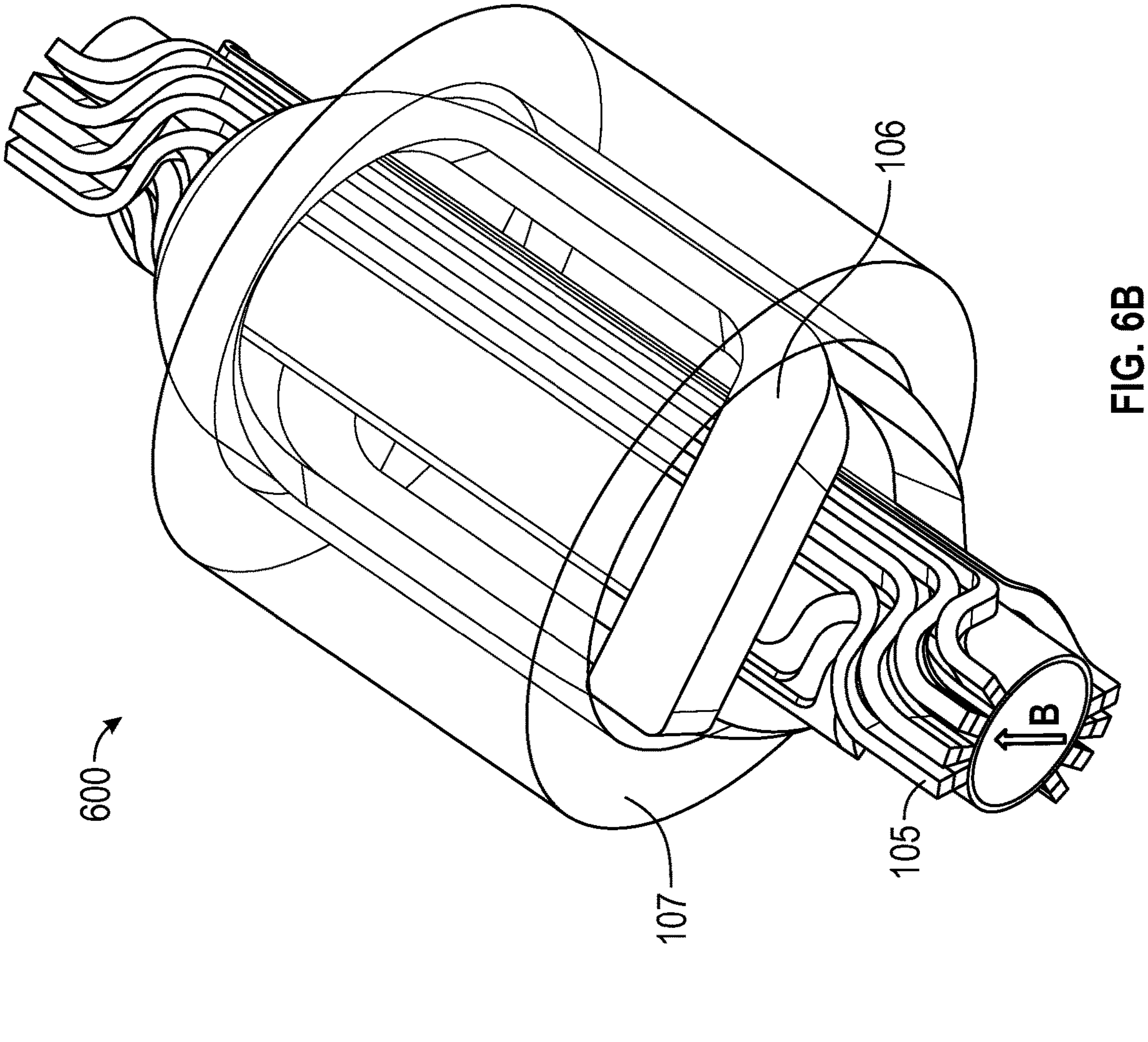
FIG. 6B depicts a dipole coil configuration, in accordance with the disclosed embodiments.

FIGS. 6A and 6B depict a dipole coil assembly 600. The dipole coil assembly 600 comprises a series of superconductors 105 in spaced relation around a central void 605. The ends of the superconductors can be curved at curve 610 away from their straight path 615 along the middle 620 of the central void 605, such that the ends are concentrated in groups along the top 625 and bottom 630 of the two-dimensional cross plane 635 of the central void 605. This creates a dipole type magnetic field at the respective ends 640 and 645 of the dipole coil assembly as shown by magnetic field 650. As illustrated in FIG. 6B, the system 600 can comprise a primary coil 106 and a ferromagnetic yoke 107, magnetically coupling the primary coil 106 with a secondary coil 105.

Figure 7:
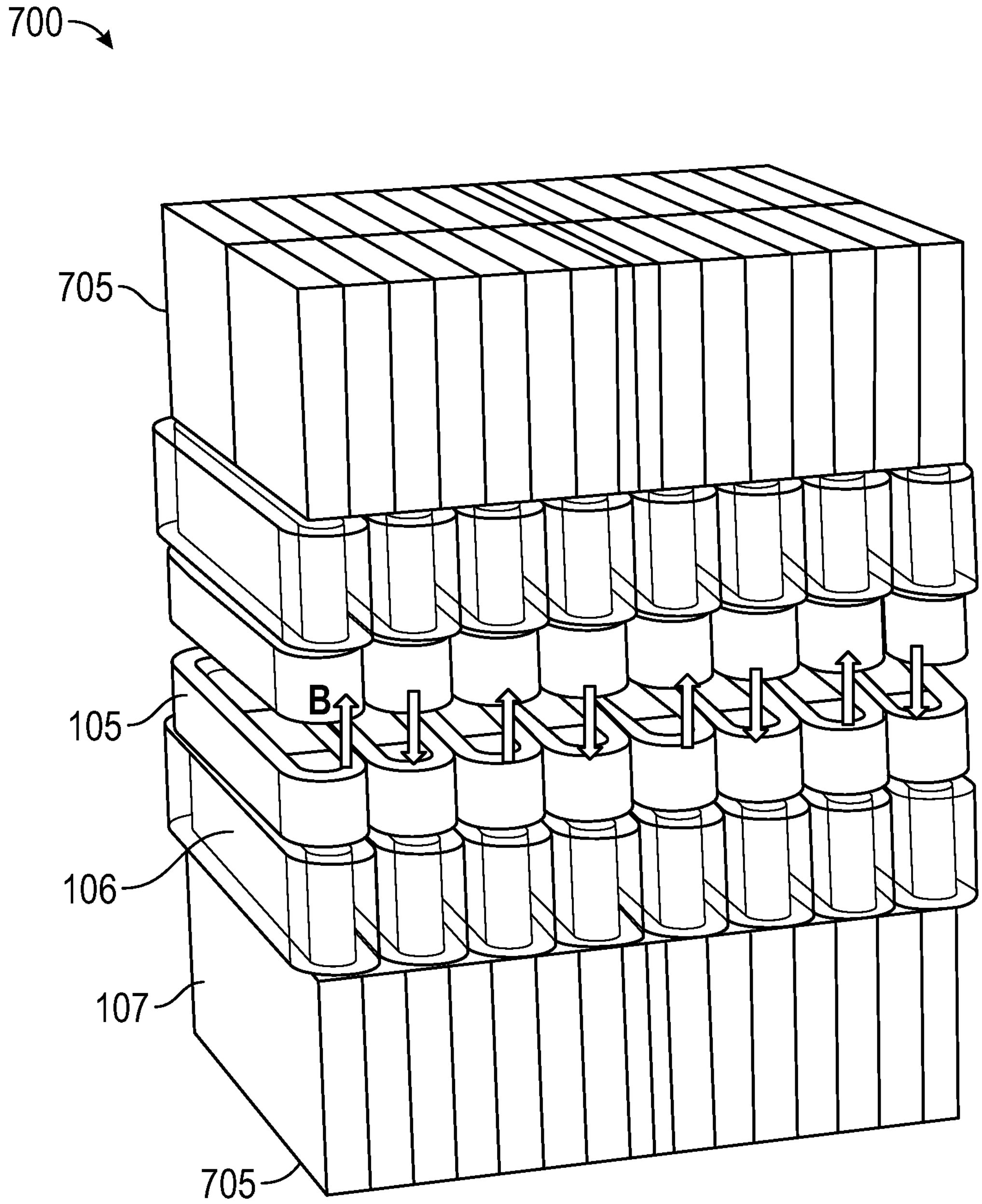
FIG. 7 depicts an undulator magnet, in accordance with the disclosed embodiments.

FIG. 7 shows the geometry of an undulator magnet 700 for generating an alternating field. Each magnet pole has primary coils 106 with opposite current directions and secondary short-circuited coils 105. A yoke 107 can be provided on the respective ends 705 of the undulator magnet 700

Figure 8:
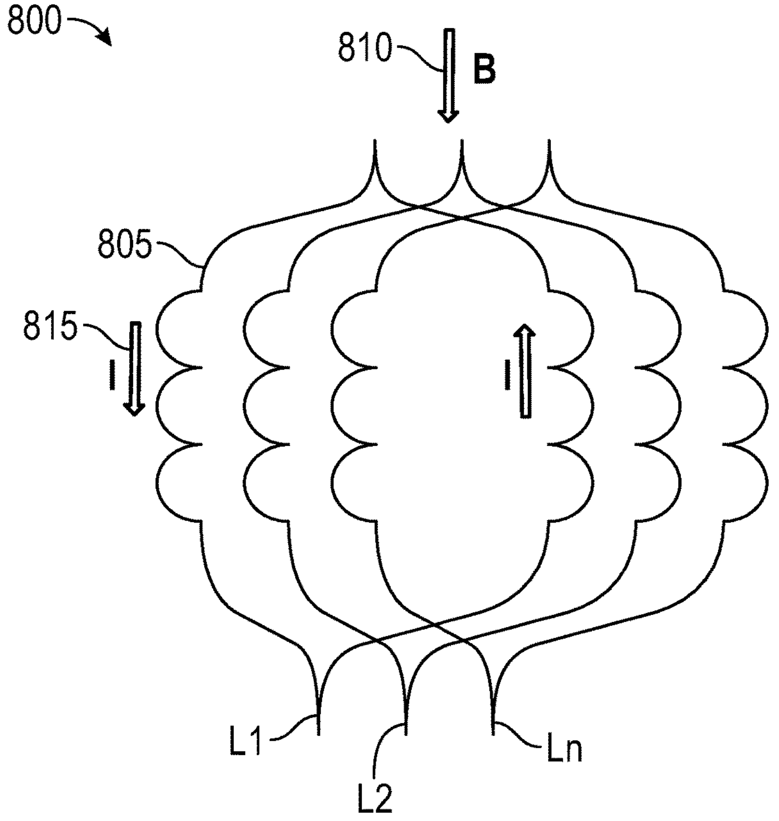
FIG. 8 depicts a schematic diagram of coil assembled from the stack of conductors, in accordance with the disclosed embodiments.

FIG. 8 depicts a schematic diagram 800 of coils 805 assembled from the stack of conductors, and the associated current 810 and magnetic fields 815.

Figure 9:
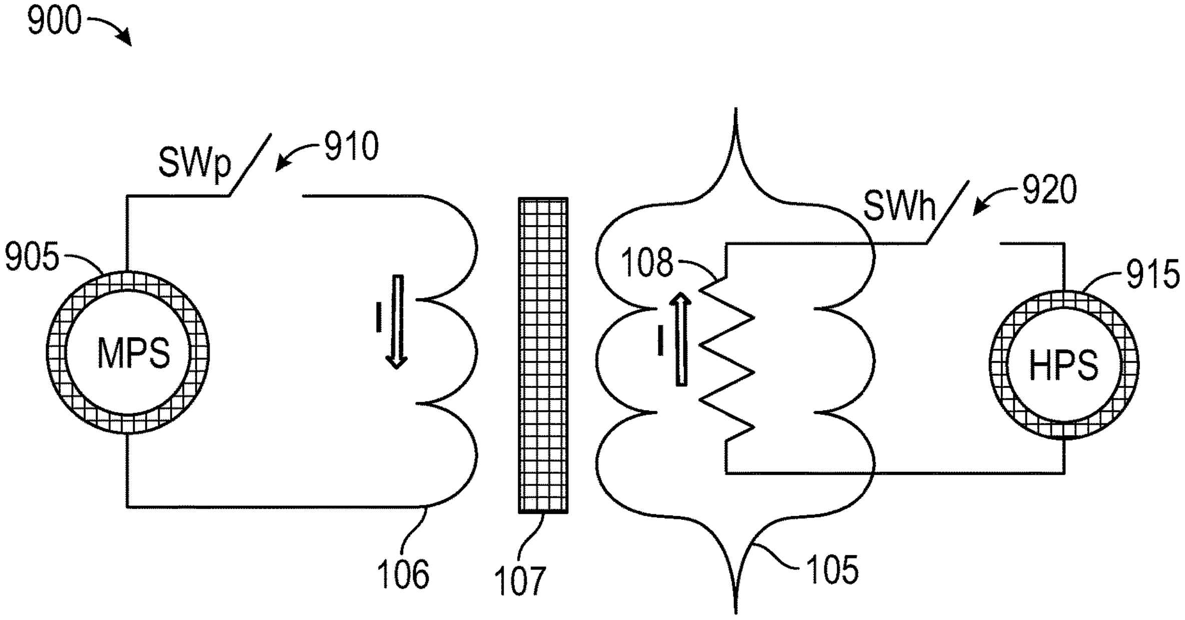
FIG. 9 depicts a schematic diagram of magnet system for a persistent current operation, in accordance with the disclosed embodiments.

FIG. 9 illustrates a system 900 for generating a semi-permanent magnetic field in accordance with the disclosed embodiments. The system 900 comprises a primary coil 106 connected to a primary power supply 905 by a primary circuit switch 910. A ferromagnetic yoke 107 is shown, magnetically coupling the primary coil 106 with a secondary coil 105. The secondary coil 105 can be configured in spaced relation with a heater coil 108. The heater coil 108 is connected to a heater power supply 915 via a heater circuit switch 920.

Figure 10:
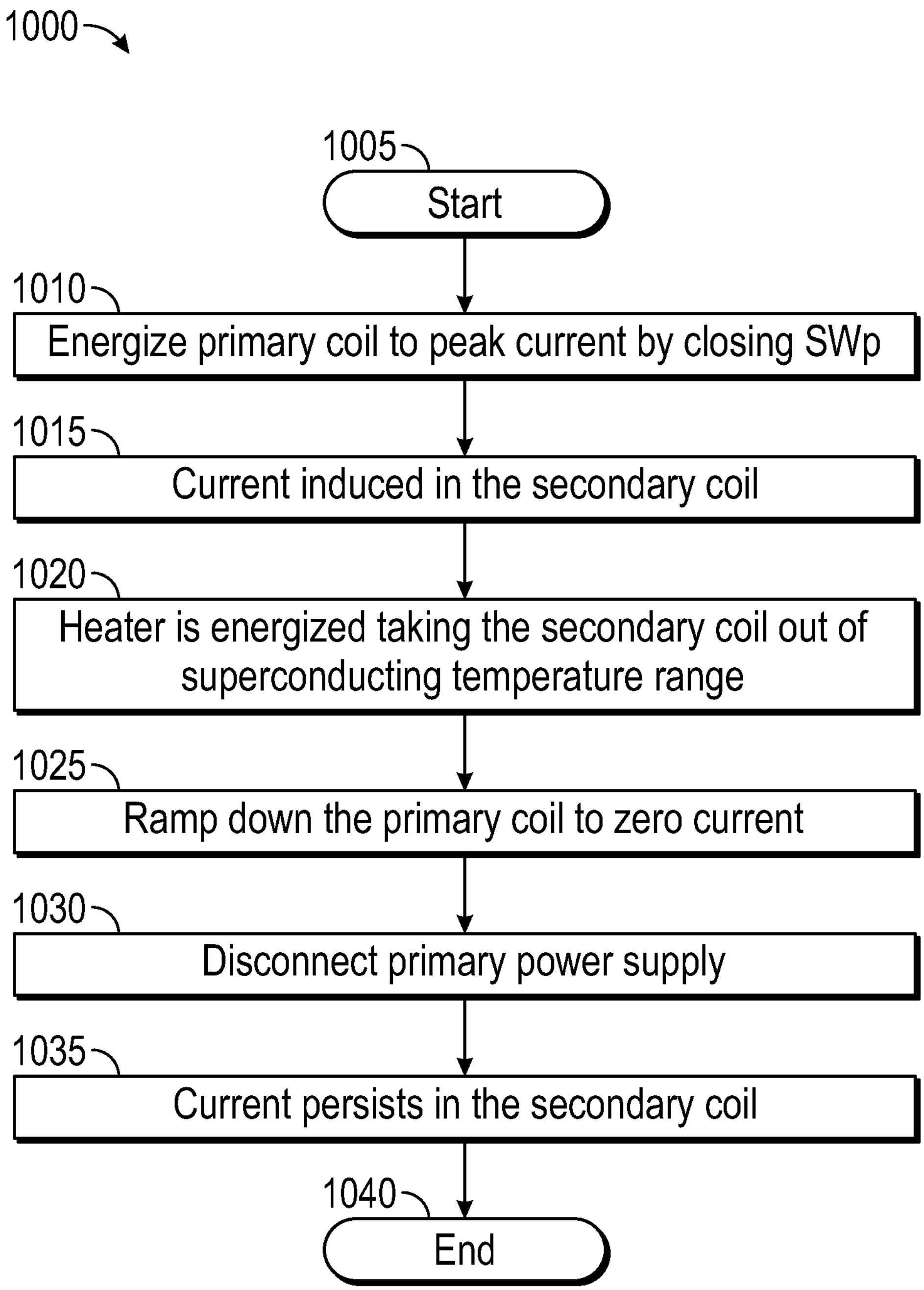
FIG. 10 depicts steps associated with a method for generating a persistent electromagnet, in accordance with the disclosed embodiments.

FIG. 10 illustrates steps associated with a method for inducing a permanent (or semi-permanent) magnetic field according to the embodiments illustrated in FIGS. 1-9. The method begins at 1005. At 1010 the primary coil 106 can be energized to peak current by closing the switch 910. At this point in time, the secondary coil 105 can be non-superconducting (heated by the heater 108 from heater power source 915) or superconducting depending on design consideration.

If the secondary coil is in a superconducting condition, a current I will be induced in an opposite direction to the primary current, as shown at 1015. Once a secondary coil experiences the induced current, the heater can be energized as shown at 1020 from the heater power supply 915, to clear them by the secondary coil heating. At 1025, the current in the primary coil can be ramped down to a zero current which will induce the persistent (or semi-persistent) current I in the secondary coil. The primary power can be disconnected at 1030. The current will continuously circulate generating a very stable magnetic field B at 1035, at which point the method ends at 1040.

Figure 11:
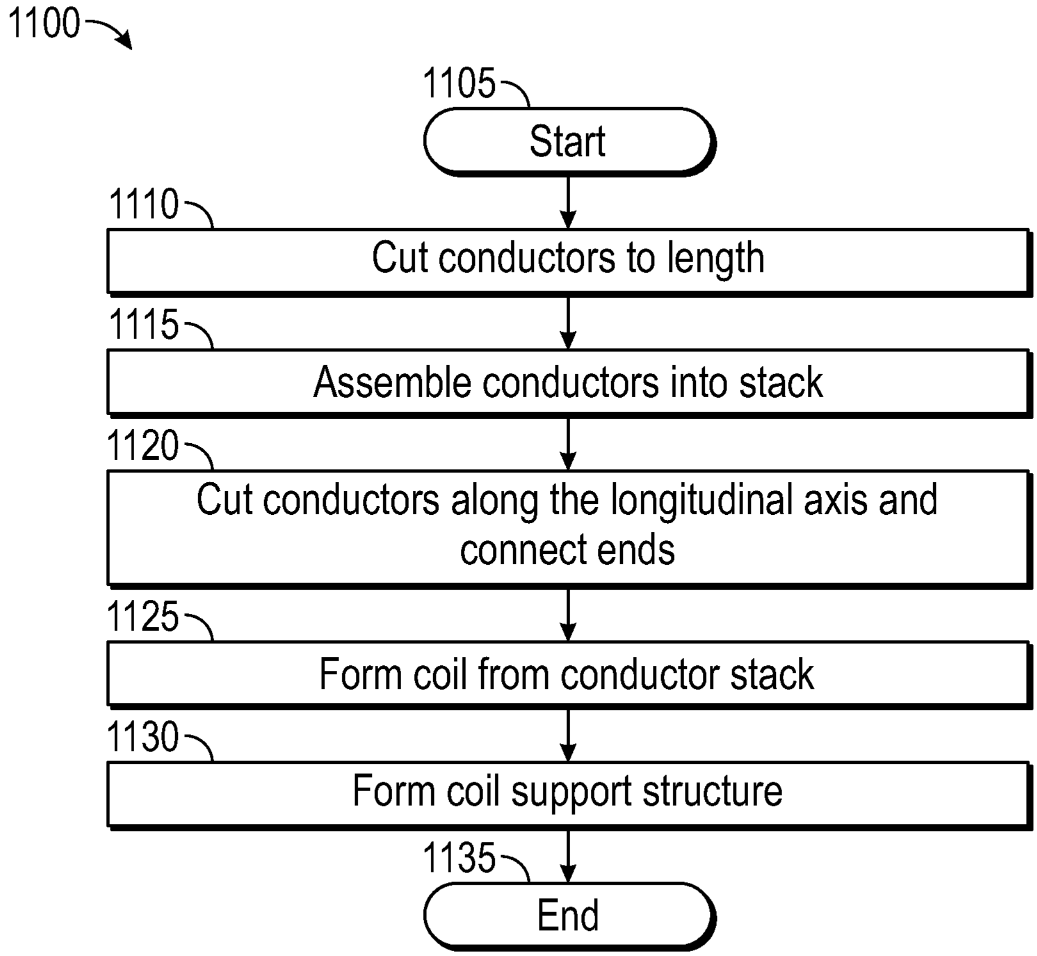
FIG. 11 depicts steps associated with a method for fabricating a magnet, in accordance with the disclosed embodiments.

In certain embodiments, a method 1100 for manufacturing a superconducting magnet with a coil configuration using a tape type conductor, which is assembled from a stack of conductors having a longitudinal cut beside both ends forming closed superconductor loops without splices is disclosed. FIG. 11, illustrates steps associated with such a method 1100. The method begins at 1105.

At step 1110 a set of conductors can be cut to length according to the half coil perimeter desired. The conductors can comprise high or low temperature superconductors. Next at 1115, the cut conductors can be assembled into a conductor stack. In certain embodiments this can include impregnating the stack with epoxy.

Next, the stack of conductors can be cut along their length, but leaving the ends uncut, as shown at 1120. The ends of the coils can be soldered, sintered, or otherwise shorted to each other at their ends.

Next at 1125 a coil can be formed from the stack of conductors. At step 1130 a material forming a coil support structure can be molded around the system. The material can be a melted low temperature alloy forming the coil support structure. In certain embodiments, a heater wire or a Rogowski coil can be formed around the coil. In certain embodiments the coil can be mounted inside a multipole magnet ferromagnetic yoke.

Figure 12:
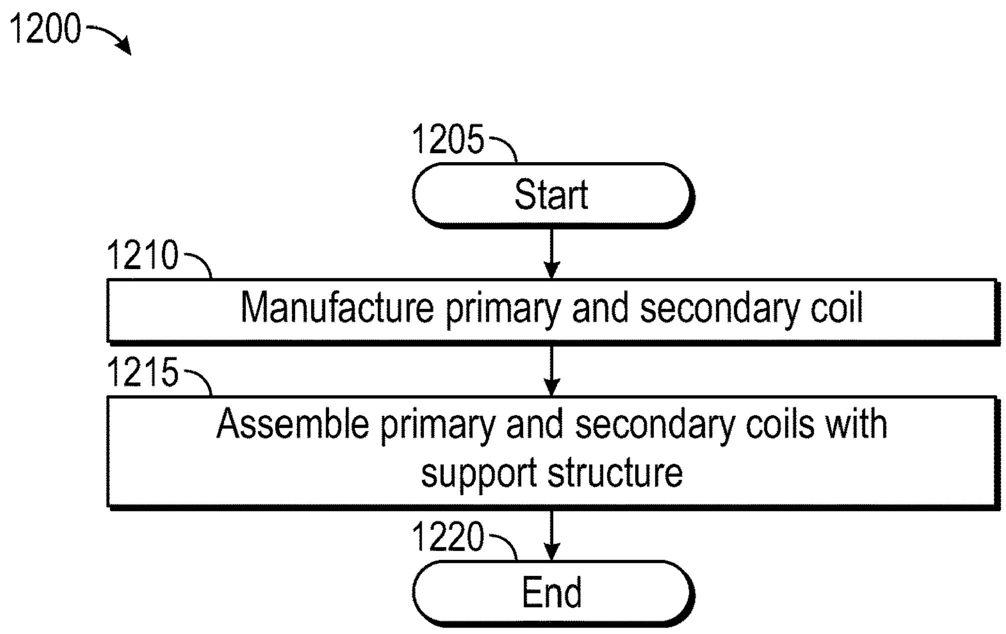
FIG. 12 depicts steps associated with a method for fabricating a persistent electromagnet, in accordance with the disclosed embodiments.

FIG. 12 illustrates a method 1200 for constructing a semi-permanent magnetic system building on the method illustrated in FIG. 11 and the systems in FIGS. 1-9. In this method, at step 1205, a secondary coil can be manufactured. This coil is used as a secondary coil that can be excited by a primary coil. Next, at step 1210, the primary and secondary coils can be assembled with a support structure. In certain embodiments the support structure can comprise a ferromagnetic yoke. The fabrication method ends at 1215.

Once the coils are configured with the ferromagnetic yoke, the secondary coil is used in the magnet system as the magnetic field stabilization coil.

The primary and secondary coils can be configured with the ferromagnetic yoke. Currents in the primary coils are in opposite directions from one another, thereby forming an alternating current in the secondary coils and alternating magnet field. That is, the opposing currents in secondary coils are excited by currents in primary coils.

An aspect of the disclosed embodiments is to address problems with current methods which have a large time constant of trapped current decay and associated operational constraints. The disclosed solution includes using HTS coils without splicing, and longitudinal cuts of HTS tape where the cuts do not extend through the ends of the tape. The disclosed aspect can be used for solenoids and levitation devices where the HTS coil is assembled from parallel superconducting loops.

The disclosed techniques can also be applied in association with iron, or other such magnets. In such embodiments, the magnet system comprises a primary coil used as a magnetic field source and a secondary one where the induced current circulates. In some embodiments, a permanent magnet assembly can be used to generate the current in a secondary short-circuit coil. In other embodiments, a quadrupole magnet system (or other multi-pole system) can be configured in combination with an HTS closed-loop-type coil as illustrated in FIG. 2.

In all such embodiments, a key aspect of the HTS coils is using a stack of HTS tapes and cutting them in a longitudinal direction without cutting at the ends. The coil ends should have enough length to transport the circulation in the loop current. After the cut, the stack of loops can be deformed into a round or another configuration as shown in FIG. 2. In certain embodiments, the HTS coil system can include external Kapton electrical insulation and a toroidal Rogowski coil can be wound on the top of coil to measure total current. The system can further include heaters and voltage tap wires as necessary.

Figure 13A:
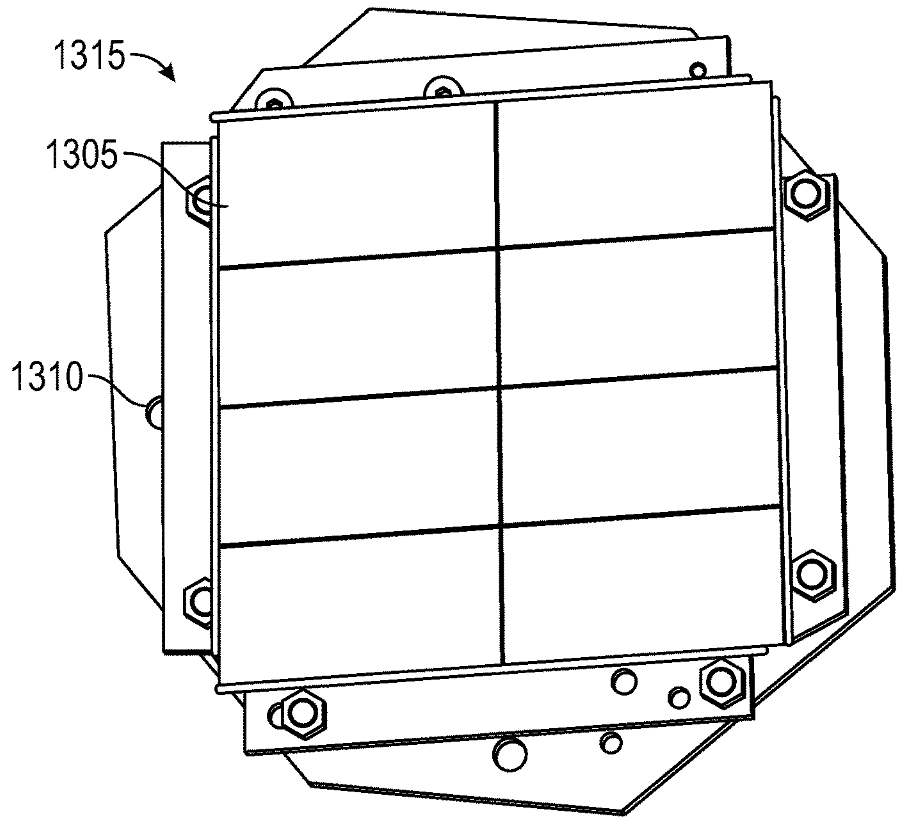
FIG. 13A depicts a permanent magnet assembly, in accordance with the disclosed embodiments.
Figure 13B:
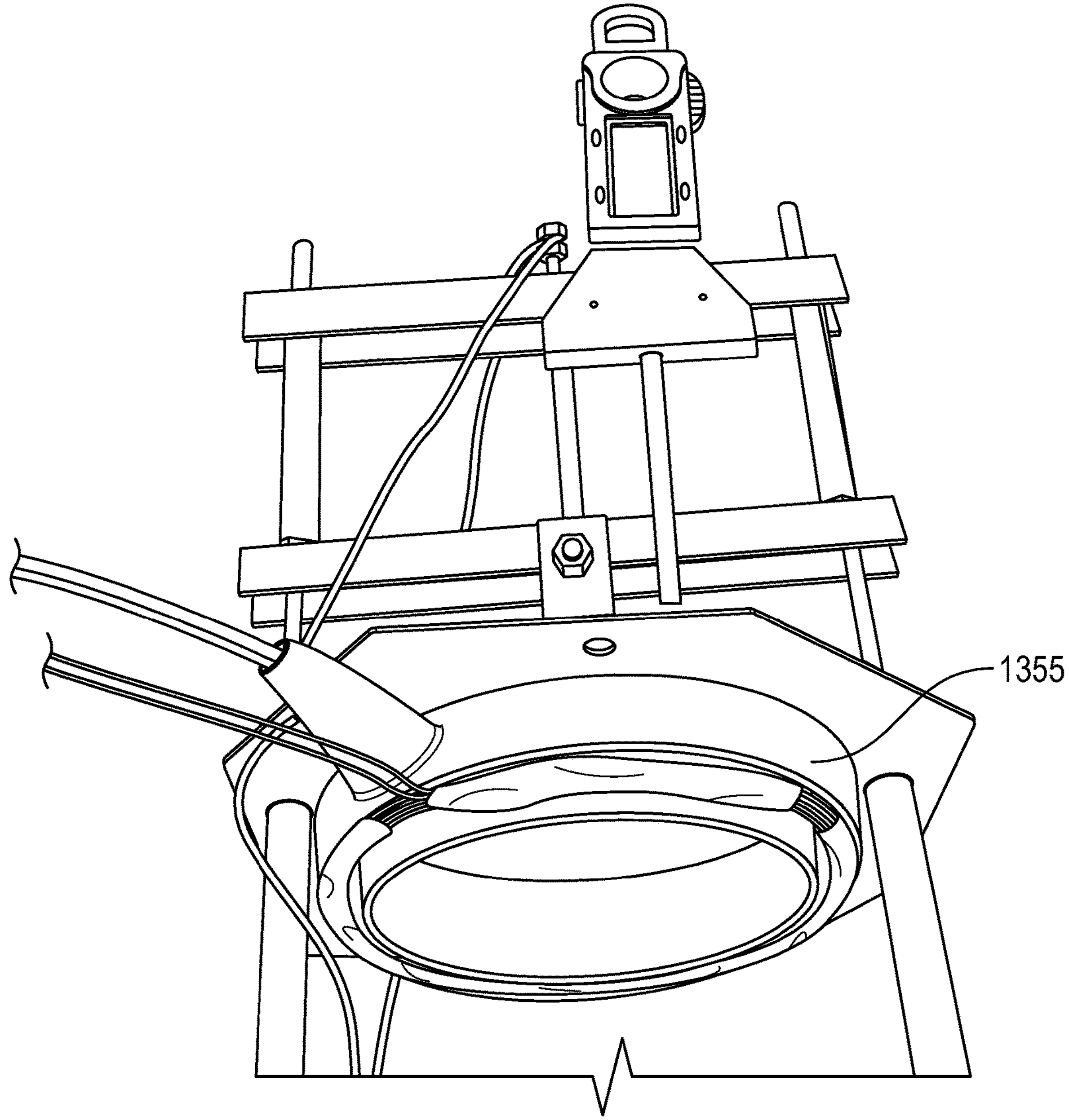
FIG. 13B depicts an HTS coil, in accordance with the disclosed embodiments.

A permanent magnet system 1315 is illustrated in FIG. 13A. A plurality of permanent magnets 1305 can be assembled on a ferromagnetic plate 1310 in order to generate a primary magnetic field in the vicinity of an HTS coil 1355 as illustrated in FIG. 13B. In certain embodiments, the permanent magnets 1305 can comprise eight SmCo5 permanent magnet bricks, but other numbers/types of magnets can also be used in other embodiments.

Figure 13C:
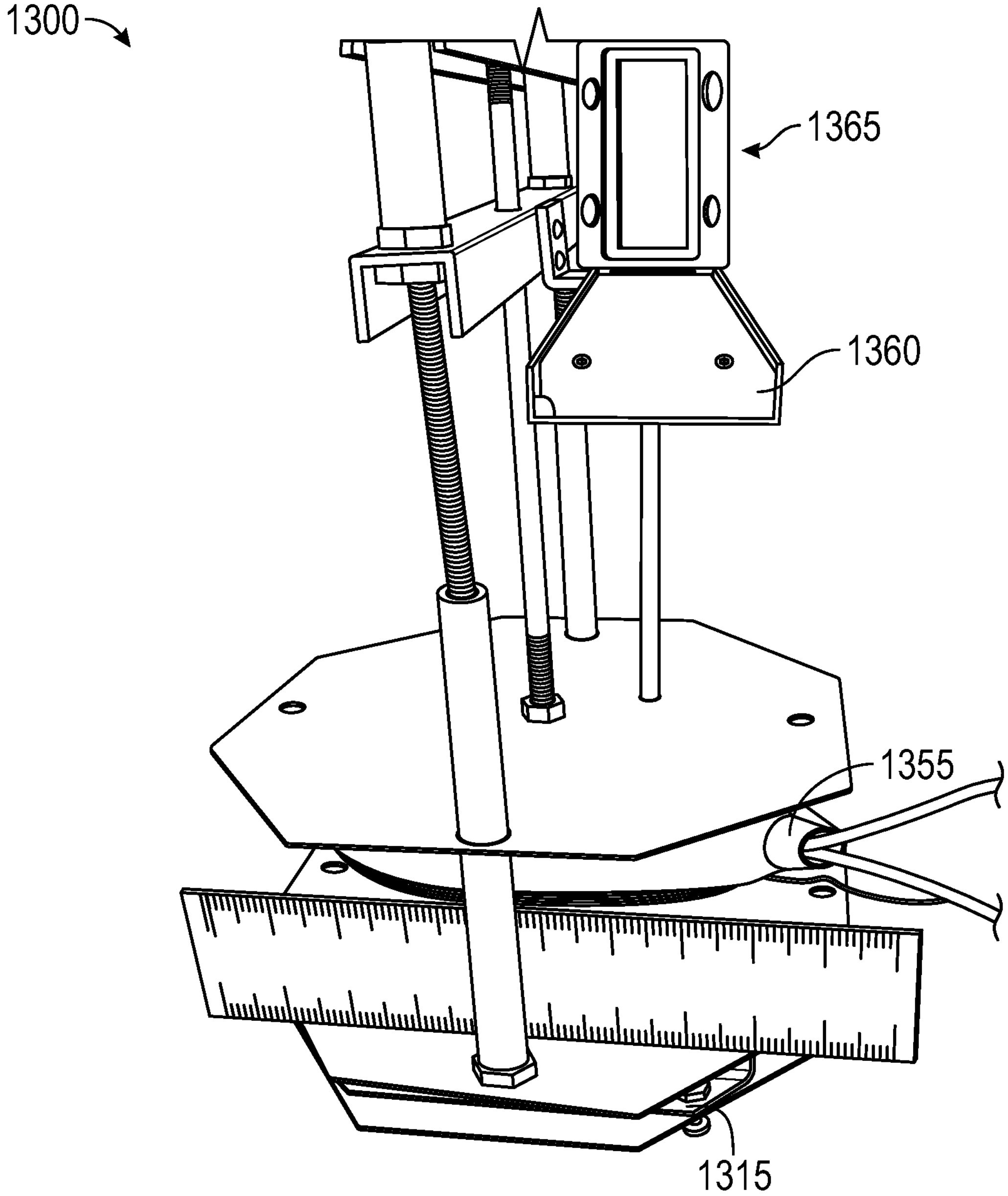
FIG. 13C depicts a permanent magnet levitation assembly comprising a permanent magnet assembly and HTS coil system, in accordance with the disclosed embodiments.

FIG. 13C illustrates that the system 1300 can be configured so that the HTS coil 1355 can be configured to move up or down in the vertical direction. The coil 1355 position can be adjusted with a mechanical lift 1360 controlled digitally with a digital dial indicator 1365.

In operation, the assembly can be cooled by liquid nitrogen (at temperatures in the range of 77 K). Initially, the coil can be held above, or otherwise away from the magnetic assembly for cooling. After cooling, the coil can be lowered or otherwise positioned in place under the coil weight. The current induced in the coil can cause the system to levitate. Decreasing the distance between the coil and magnet will induce an increased current in the coil, with the maximum possible current in the coil, defined by the strength of the permanent magnets and the superconductor's critical current.

Figure 14:
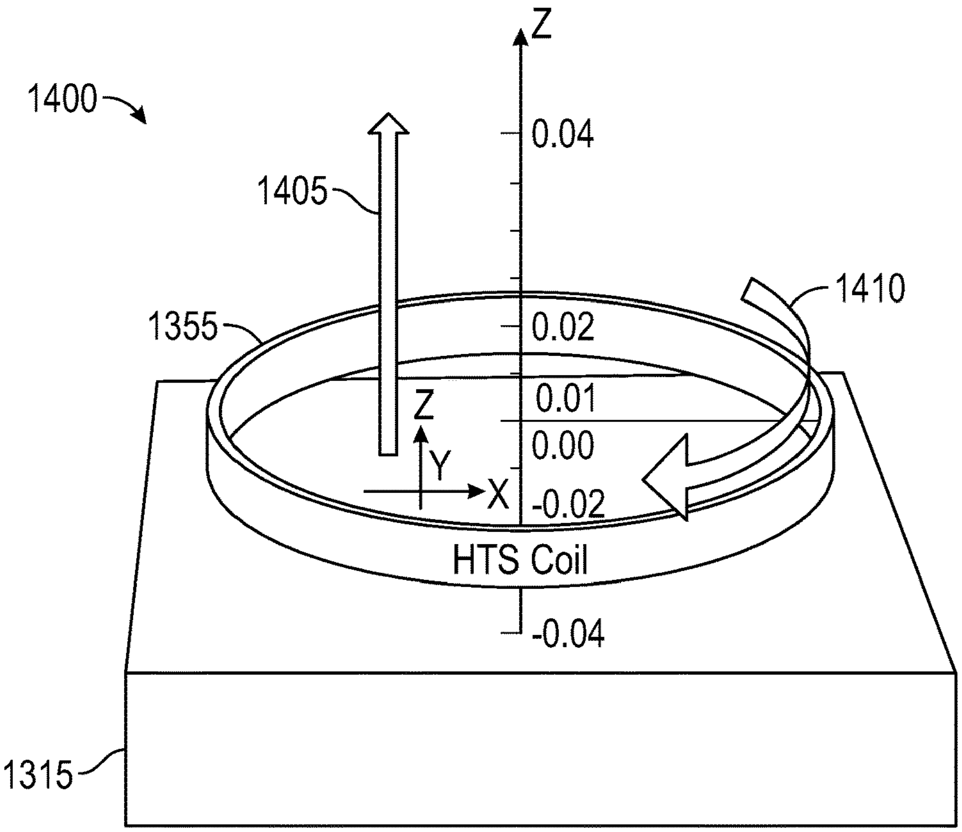
FIG. 14 depicts an illustration of electromagnetic fields associated with a permanent magnet assembly, in accordance with the disclosed embodiments.

FIG. 14 illustrates provides a diagram 1400 of the operating principle of the disclosed embodiment. As illustrated, the permanent magnet 1315 is configured below the HTS coil 1355. The magnetic field 1405 induces current 1410.

The exemplary system can be placed in a can filled with liquid nitrogen. The coil can be configured in the uppermost vertical position. After several minutes of assembly cooling, the coil can be released and dropped to the self-supporting (levitated) position.

Figure 15:
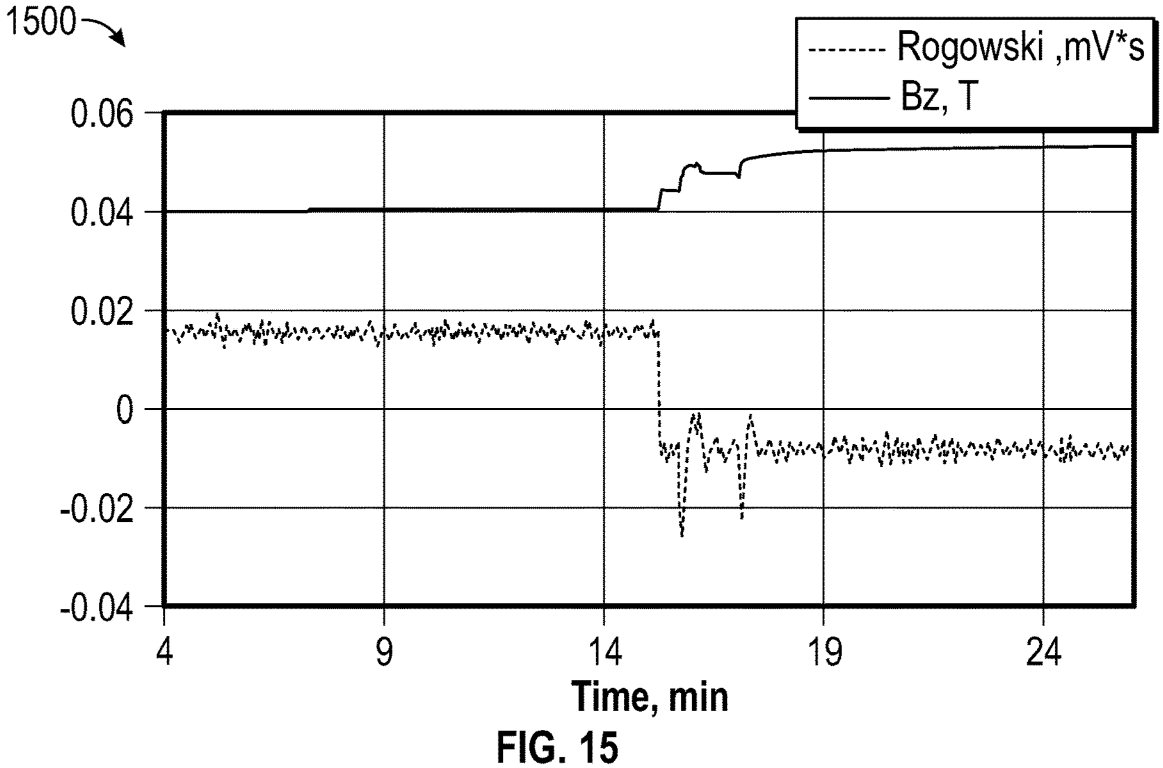
FIG. 15 depicts a chart of experimentally obtained coil fields and integrated voltages, in accordance with the disclosed embodiments.

In testing, the coil was loaded with a weight of 1.2 kg. The coil stably levitated during 10 min (as illustrated by chart 1500 in FIG. 15, with a field of 0.04 T on the surface where the Hall probe was positioned. After 15 min of testing, the weight was doubled to 2.4 kg. The gap between the coil and permanent magnet block was closed with the corresponding field increase to 0.053 T. The induced HTS coil currents measured by the Rogowski coil were 655 A and 1017 A correspondingly. The magnetic field was highly stable (better than 0.5 Gauss) for the fixed coil and Hall probe positions.

It should be noted that, among various advantages, the disclosed system is resistant to damage during warm up. Indeed, it is almost impossible to quench the coil in the liquid nitrogen via mounting on the coil surface heater. When the assembly is withdrawn from the superconducting environment (e.g. liquid nitrogen bath), the HTS resistance ramps slowly and the associated current slowly dissipates.

Figure 16:
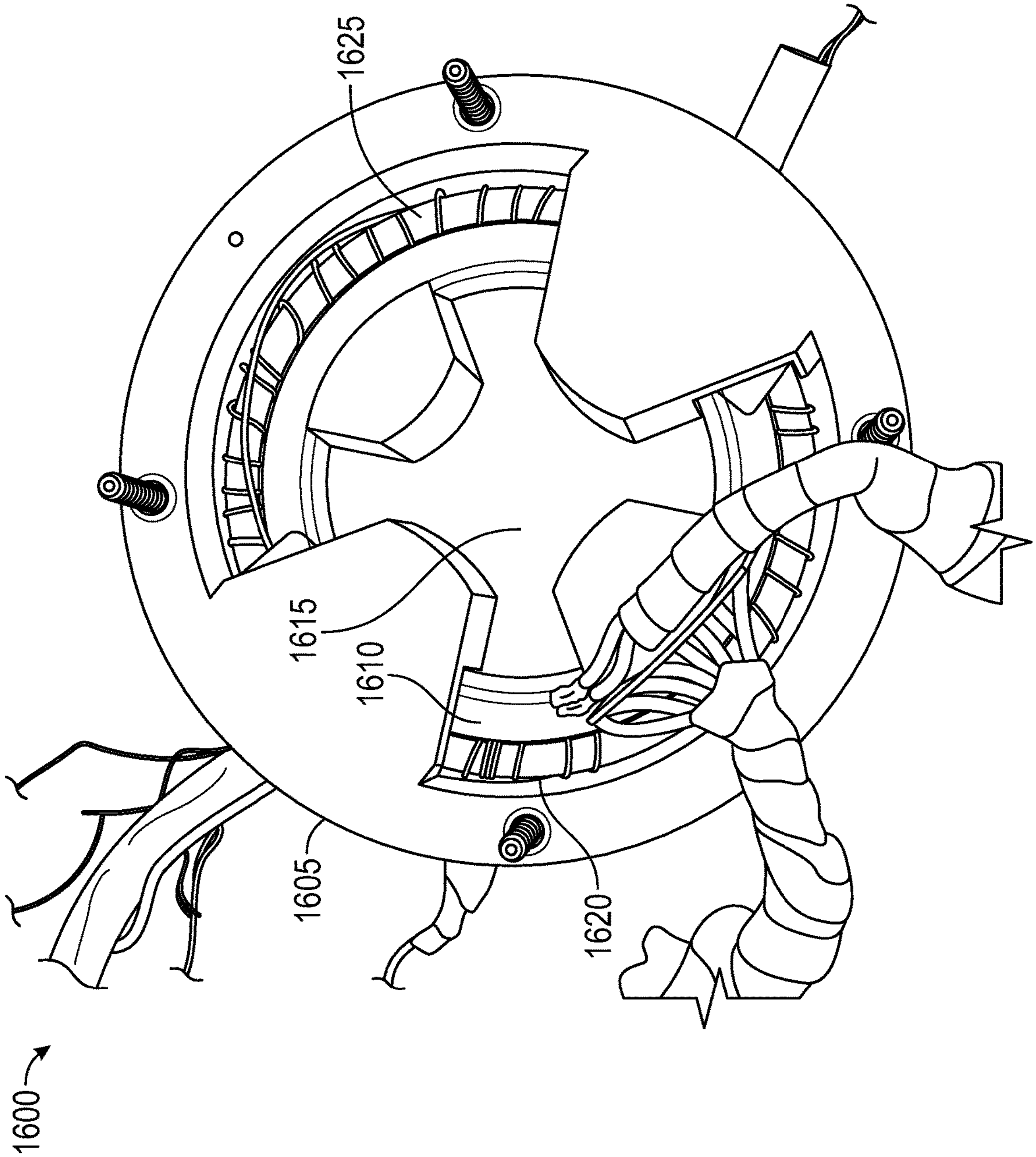
FIG. 16 depicts a quadrupole magnet assembly, in accordance with the disclosed embodiments.

In another exemplary embodiment, a quadropole magnetic assembly 1600 is disclosed, as illustrated in FIG. 16. For the quadrupole magnet assembly 1600, a magnet yoke 1605, such as an iron yoke, and primary HTS coil 1610 can be used. The magnetic field in the aperture 1615 of this magnet can be formed by iron poles and can provide good field quality. In the space between the yoke and coil, a secondary HTS coil 1620, assembled from HTS closed loops can be mounted in the assembly. The number of loops can be varied according to design considerations, but in an exemplary embodiment 50 loops can be used. In certain embodiments, a nichrome heater wire 1625 can be wound around the coil 1620. The heater wire 1625 can include a resistance as required for the application. In an exemplary embodiment, a 3.3Ω resistance can be provided. Additionally, multiple turns of a Rogowski toroidal coil can be used to measure current. The number of turns will depend on design considerations. In an exemplary embodiment, 200 turns of Rogowski toroidal coil can be used.

A secondary coil can also assembled. In an exemplary embodiment, the secondary coil can comprise 50 loops of 12-mm-wide HTS wire cut in the middle as shown in FIG. 1. The magnet can be further instrumented with voltage taps and Hall probes mounted on the magnet poles to monitor the total magnetic field generated by both HTS coils.

Figure 17:
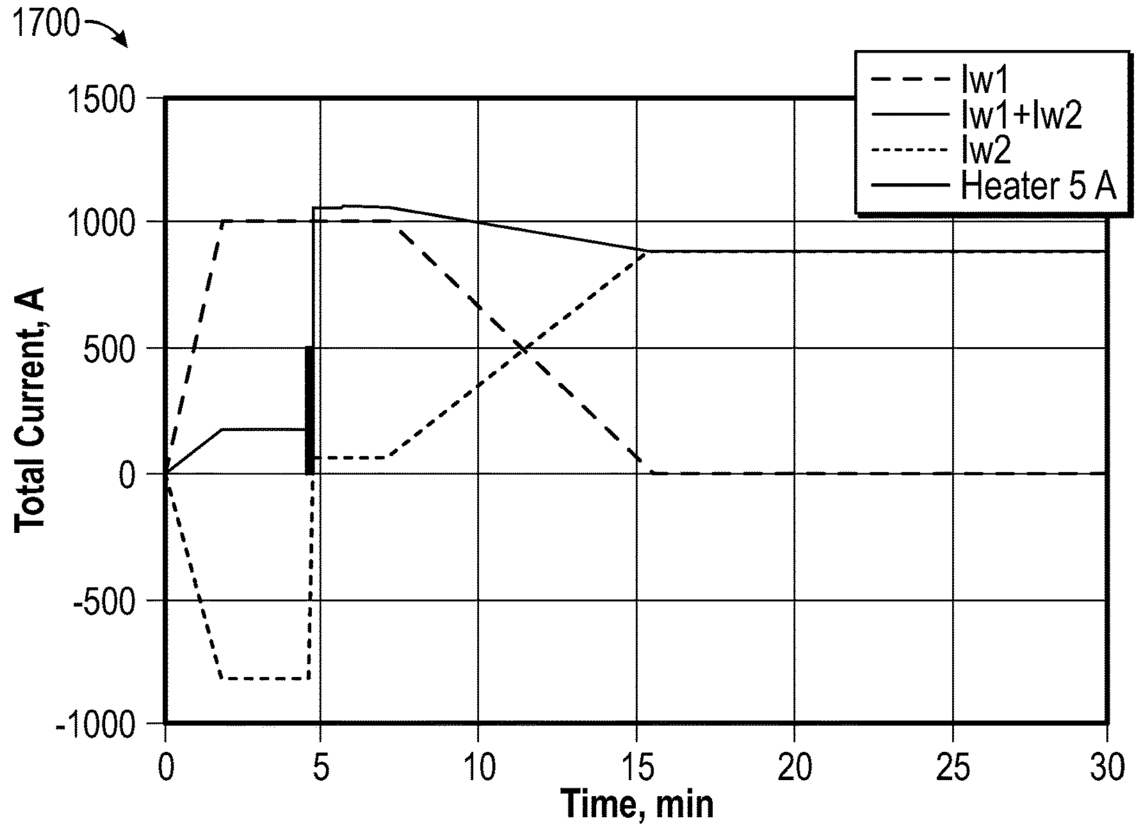
FIG. 17 depicts experimental data illustrating current as a function of time in a primary coil, in accordance with the disclosed embodiments.

In certain embodiments, the system 1600 can be cooled, for example, by placing it in a liquid nitrogen bath. The system was tested with 50 A in the primary coil, which had 20 turns, and correspondingly, a total current of 1000 A, as shown in chart 1700 illustrated in FIG. 17.

Figure 18:
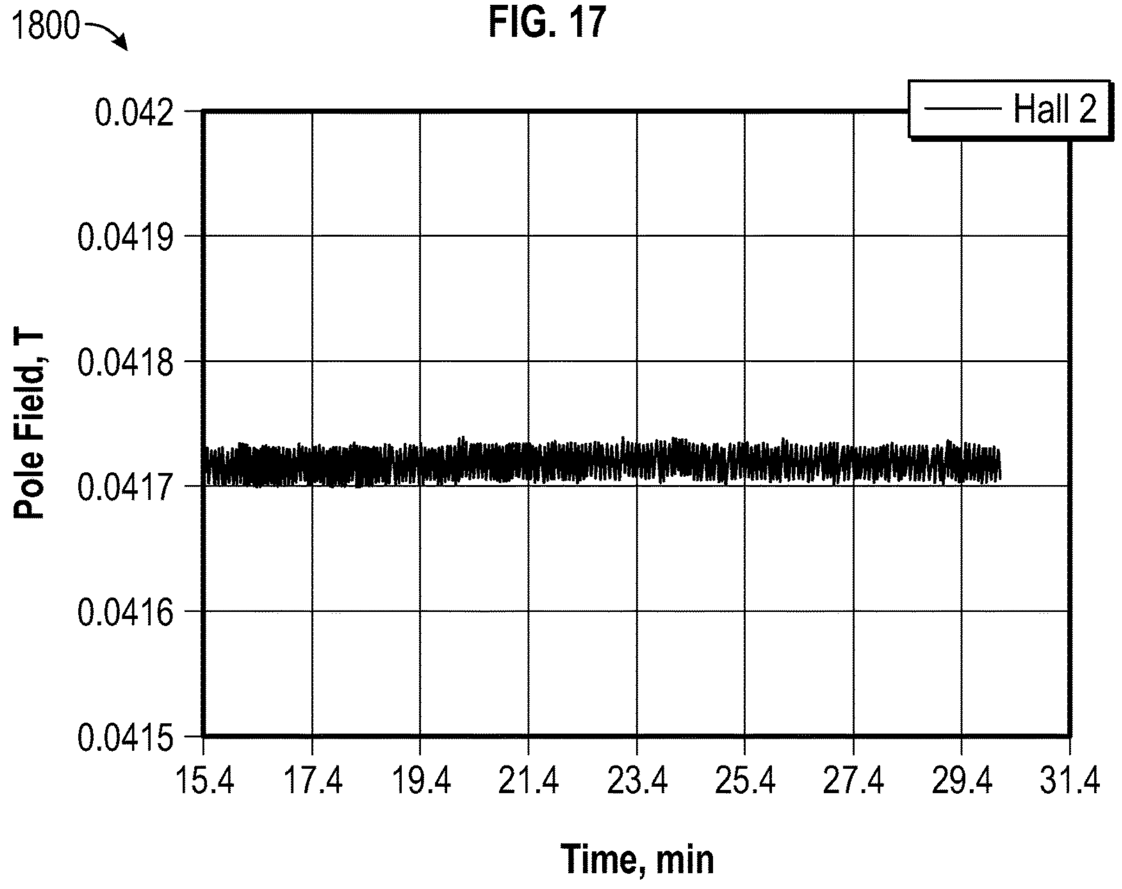
FIG. 18 depicts experimental data illustrating magnetic field as a function of time in an aperture of a quadrupole assembly, in accordance with the disclosed embodiments.

When the total current in the primary coil reached 1000 A, a negative current of 833 A was induced in the secondary. The difference may be a result of imperfect coupling between the two coils. After 4.5 min, the heater was energized by a 5 A current pulse, which transferred the secondary coil in the normal condition with a corresponding current jump to zero. Later, the primary total current was ramped down to zero at 2 A/s. The positive 883 A current was induced in the secondary coil, circulating without decay, and generating the stable magnetic field in the magnet aperture as illustrated by chart 1800 in FIG. 18.

Figure 19:
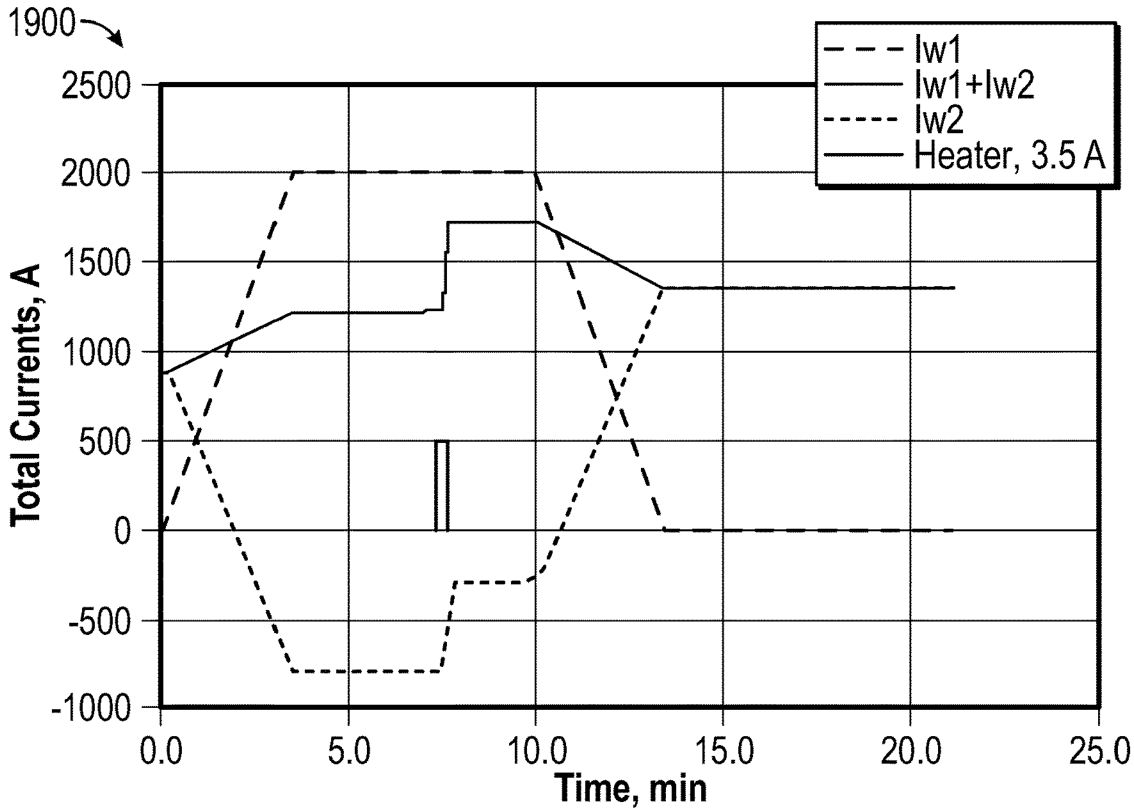
FIG. 19 depicts experiment data illustrating primary coil ramp, in accordance with the disclosed embodiments.
Figure 20:
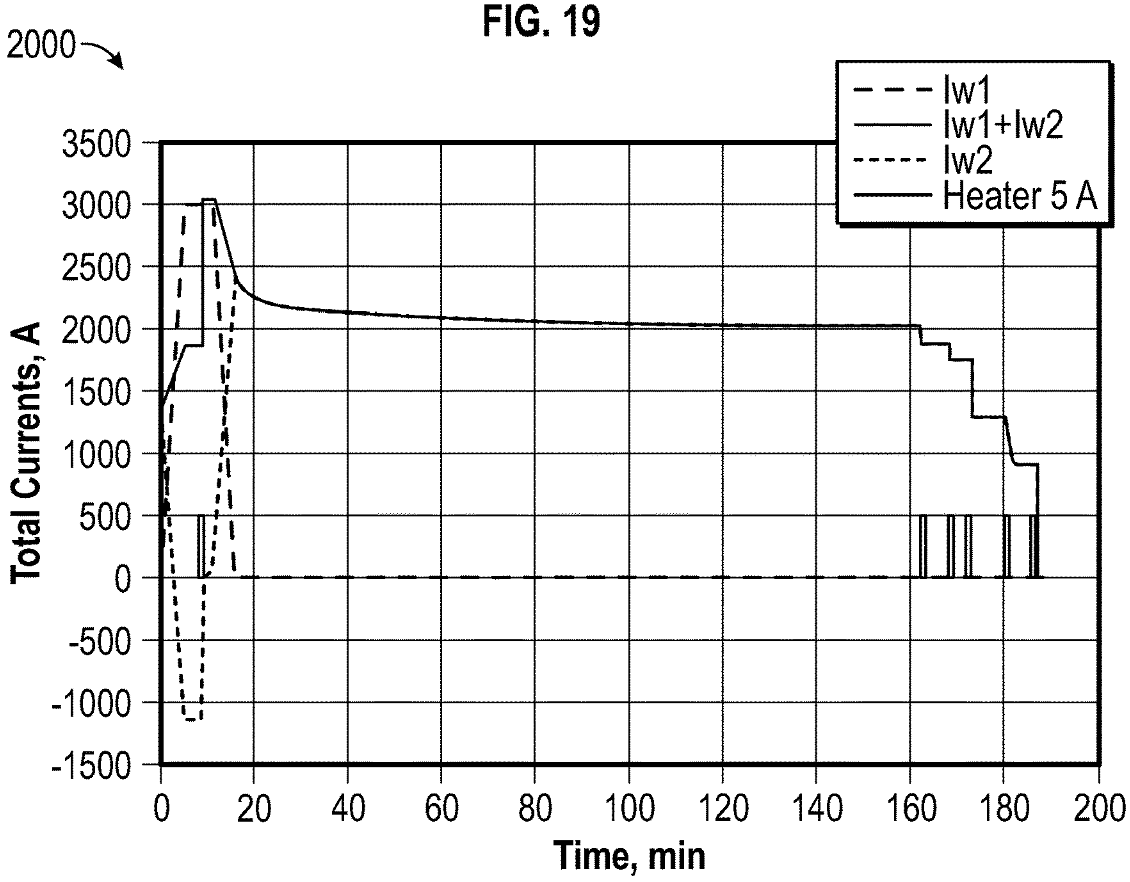
FIG. 20 depicts experiment data illustrating primary coil ramp, in accordance with the disclosed embodiments.

In the test, the magnetic field was stable in the range of 0.2 Gauss, representing the Hall probe resolution. FIG. 19 illustrates a chart 1900 showing the primary coil ramp to 2000 A. Measured using the Hall probe, the magnetic field stability was again in the range of 0.2 Gauss. The 3000 A primary coil total current ramp is shown in chart 2000 FIG. 20.

Figure 21:
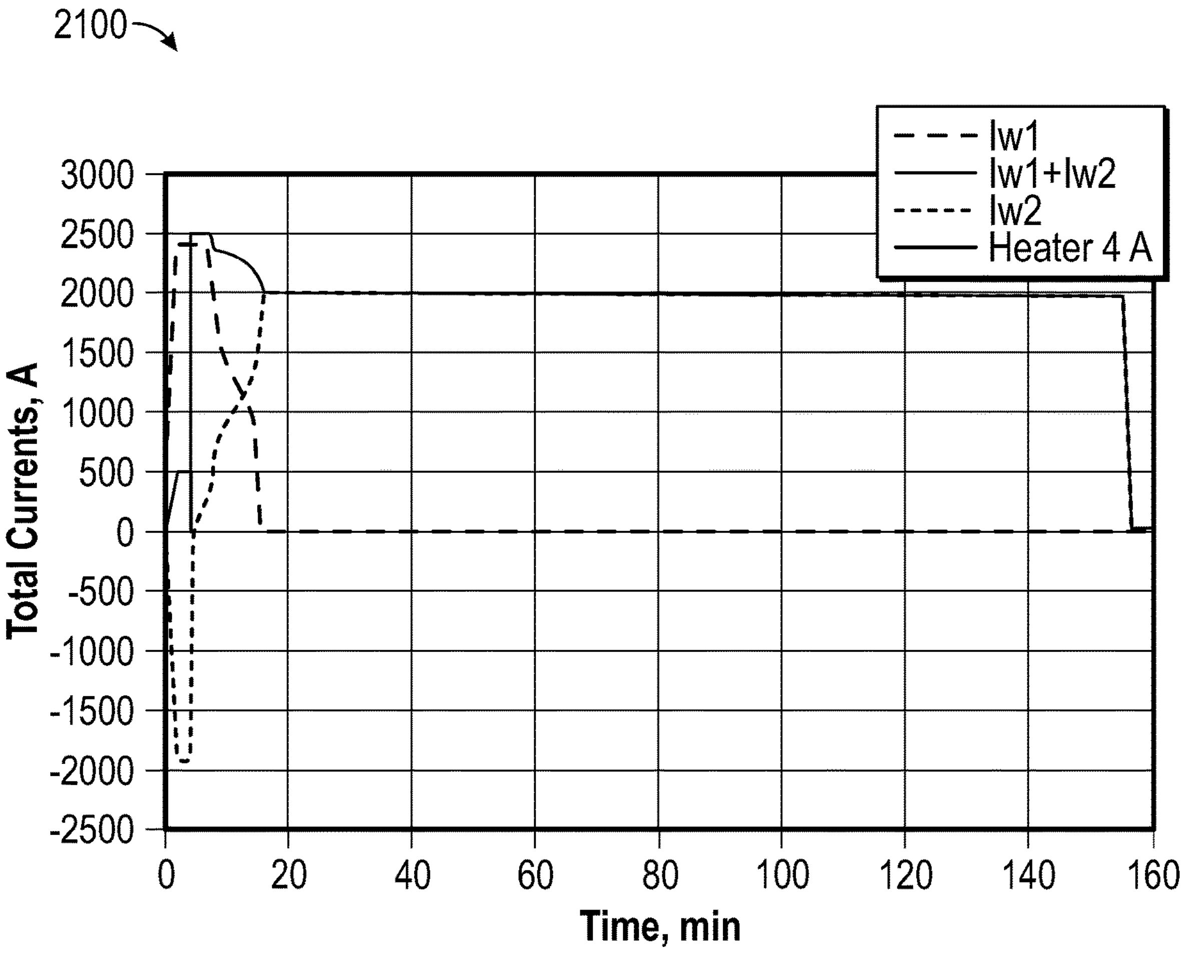
FIG. 21 depicts experiment data illustrating primary coil ramp, in accordance with the disclosed embodiments.

The peak secondary current measured during the test was 2283 A, which initially had a fast decay and became much slower later, with a rate of 0.78 A/min. This means that the secondary coil at this current had a residual resistivity in some areas. After 160 min of stable secondary current circulation, five short heater pulses were initiated to check for the possibility of the secondary current's controlled ramp down regulation. The coil was not quenched and showed stable performance. The maximum stable secondary coil performance was found to be close to 1900 A at 2400 A in the primary current as illustrated by chart 2100 in FIG. 21. The current in the secondary circulated for more than 2 hours without decay, continuously generating the magnetic field in the magnet aperture without an external power source.

Figure 22:
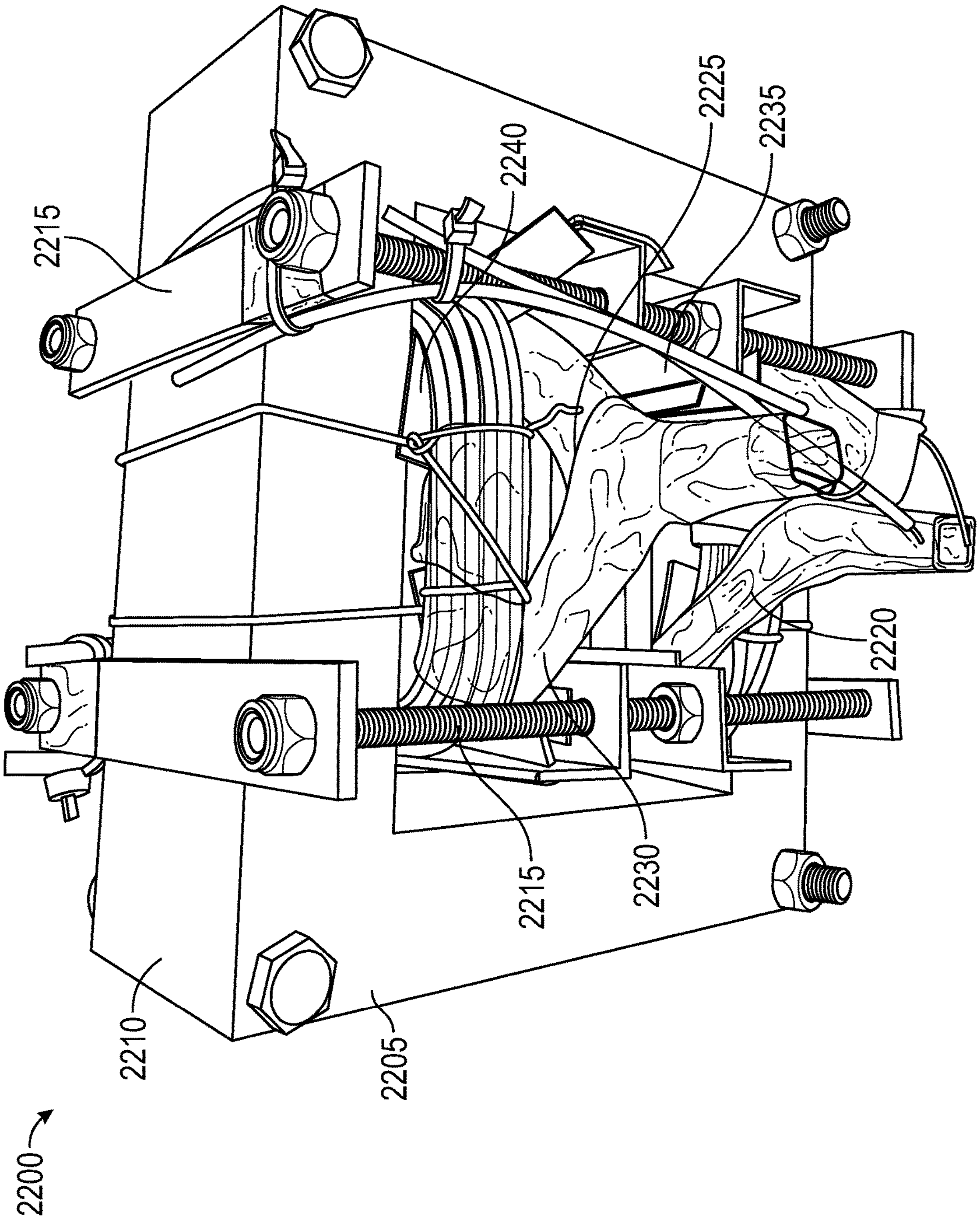
FIG. 22 depicts a dipole magnet assembly, in accordance with the disclosed embodiments.

FIG. 22 illustrates a dipole magnet assembly 2200 in accordance with the disclosed embodiments. The dipole magnet assembly 2200 includes a yoke 2205, which can comprise an iron yoke laminated with an outer covering 2210. Coil supports 2215 can be configured around the yoke 2205. The dipole magnet assembly 2200 further comprises a lower HTS coil 2220 and an upper HTS coil 2225 with a magnet gap 2230 between the upper HTS coil 2225 and the lower HTS coil 2220. The dipole magnet assembly can further include an HTS coil heater 2235, and an upper and lower copper coils 2240.

The HTS dipole magnet assembly 2200 can be operated at low temperature. The assembly 2200 was tested at the liquid nitrogen temperature 77 K. The two primary copper coils 2240, operated for several minutes can induce up to 4000 A currents in upper HTS coil 2225 and lower HTS coil 2220. A stable magnetic field of, for example, 0.5 Tesla, can be generated in the magnet gap 2230, which can be, for example, 20 mm. The generated filed can be generated with little or no decay. In certain embodiment, the current in upper HTS coil 2225 and the lower HTS coil 2220 can circulate until cooling is removed. In exemplary testing, the current in upper HTS coil 2225 and the lower HTS coil 2220 circulated for in excess of 12 hours without an external power source until the cooling was removed.

In certain embodiments, the magnets described herein can be used in association with particle accelerators and/or for particle accelerator applications. In such embodiments, particle accelerator beams of elementary particles are transported through magnetic fields of various configuration to provide stable or closed orbits. The magnets disclosed herein can be configured in association with such particle accelerators beams. The disclosed magnets can thus be configured as dipole magnets, as shown in FIGS. 6A and 6B, to bend particle beams, quadrupole magnets as shown in FIG. 4, to focus beams, sextupole and octupole magnets to correct beams configuration. etc.

For example, in certain embodiments the disclosed systems can be used with a recycler ring such as the FermiLab Recycler Ring in accordance with a disclosed embodiment. Permanent magnet dipoles and/or quadrupoles, as disclosed herein, can be used for particle beam manipulations. Further, the disclosed embodiments can be used for superconducting coils and magnet systems in Maglev levitation systems, in electrical motors, and in generators providing stable magnetic fields as excitation coils.

The disclosed embodiments thus make use of a stack of superconducting loops working in parallel without splices and electrical insulation between them to generate the stable magnetic field. The stack of superconducting loops can be bent in numerous ways, including in a geometry to create a solenoidal or multipole magnetic field. These types of coils can be mounted inside a ferromagnetic magnet core where the magnetic field is directed and formed by the associated poles.

Such embodiments offer several advantages including that they avoid problems associated with conventional parallel loops which induce different currents as they "catch" a different flux. The disclosed embodiments will not quench in one loop from the energy transferred from a nearby loop, and do not experience quench burns common in prior art approaches. Furthermore, the heat propagation during a quenching event in the disclosed system propagates evenly in longitudinal and transverse directions which reduces quenching and conductor damage risk. Finally, the HTS superconductor tape is brittle and will degrade at bending radiuses less than 10 mm.

Consequently, the disclosed designs can provide multiturn coils as parallel loops as shown in FIG. 2 and are fully transposed relative to an external magnetic flux. In particular, FIG. 2 illustrates that in the loop with current as illustrated the left part of the loop is inside the coil, but the right part is outside. The same is true for all other loops. The embodiments provide identical current generation in all loops relative to an external flux and correspondingly low power losses in the AC fields. The tape conductor also has only smooth bends and the current is redirected at the ends which are not bent. Because of the short loop perimeter and high thermal conductivity between loops, the coil is self-protected and does not need sophisticated quench detection and protection systems.

The disclosed embodiments using superconducting coil and magnet systems are advantageous because the offer: simple and low cost fabrication; high reliability as coil loops are parallel and fully transposed; coils that are self-protected against quenches; the magnet system works in a persistent current mode generating a very stable magnetic field; the power source can be used for a very short period and can be disconnected; the magnet can operate at elevated temperatures when it is an HTS; the superconducting coils do not have current leads; and the current in short-circuited coil can be smoothly reduced or zeroed by the coil heater.

Based on the foregoing, it can be appreciated that a number of embodiments, preferred and alternative, are disclosed herein. For example, a system as disclosed herein, can comprise a first conductor configured in a strip with a longitudinal cut along a portion of the first conductor; at least one second conductor configured in a strip with a longitudinal cut along a portion of the second conductor; wherein the first conductor and the at least one second conductor are arranged in a stack and a first end of the first conductor is shorted to a first end of the at least one second conductor and a second end of the first conductor is shorted to a second end of the at least one second conductor thereby forming a closed loop. In an embodiment of the system, the at least one second conductor comprises a plurality of conductors. In an embodiment of the system, the first conductor and the at least one second conductor comprise tape type conductors.

In an embodiment of the system, the first conductor and the at least one second conductor comprise superconductors. In an embodiment of the system, the first conductor and the at least one second conductor comprise HTS tape type conductors.

In an embodiment of the system, the longitudinal cut along the first superconductor is configured to be the length of a half coil perimeter; and the length of the longitudinal cut along the second superconductor is configured to the length of a half coil perimeter.

In an embodiment of the system, the stack of the first conductor and the at least one second conductor is impregnated with epoxy.

In an embodiment, the system further comprises a ferromagnetic yoke wherein the closed loop is mounted in the ferromagnetic yoke.

In an embodiment, the system comprises a primary conducting coil and a support structure configured to mount the primary coil and the closed loop.

In another embodiment, a method of manufacturing a magnet comprises cutting a longitudinal slit in at least two conductors, wherein the slit is formed along a portion of each of the at least two conductors, but does not extend to the ends of the at least two conductors, assembling the at least two conductors into a stack of conductors, shorting a first end of the at least two conductors, shorting a second end of the at least two conductors, and forming a coil from the stack of at least two conductors.

In an embodiment, the method of manufacturing a magnet further comprises forming a coil support structure. In an embodiment, the method of manufacturing a magnet further comprises cutting a longitudinal slit in at least two conductors further comprises selecting the cut length according to a desired half coil perimeter. In an embodiment, the method of manufacturing a magnet further comprises shorting the first end of the at least two conductors comprises at least one of soldering the first end together and sintering the first end together; and wherein shorting the second end of the at least two conductors comprises at least one of soldering the first end together and sintering the first end together.

In an embodiment, the method of manufacturing a magnet further comprises wrapping a heater wire around the coil. In an embodiment, the method of manufacturing a magnet further comprises wrapping a Rogowski coil around the coil.

In an embodiment, the method of manufacturing a magnet further comprises assembling a secondary coil configured as a magnetic field stabilization coil.

In another embodiment, a superconducting magnet system comprises a first conductor configured in a strip with a longitudinal cut along a portion of the first conductor, at least one second conductor configured in a strip with a longitudinal cut along a portion of the second conductor, wherein the first conductor and the at least one second conductor are arranged in a stack and a first end of the first conductor is shorted to a first end of the at least one second conductor and a second end of the first conductor is shorted to a second end of the at least one second conductor thereby forming a closed loop, a secondary coil, and a yoke configured in spaced relation with the stack of the first conductor and the second conductor.

In an embodiment of the superconducting magnet system the at least one second conductor comprises a plurality of conductors. In an embodiment of the superconducting magnet system the first conductor and the at least one second conductor comprise tape type conductors. In an embodiment of the superconducting magnet system the first conductor and the at least one second conductor comprise superconductors.

It will be appreciated that variations of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A system comprising:

a stack of conductors comprising:

a first conductor configured in a strip with a longitudinal cut in along a portion of the first conductor; and at least one additional conductor configured in a strip with a longitudinal cut in a portion of the at least one additional conductor;

wherein the stack of conductors are arranged in a stack and a first end of the first conductor is shorted to a first end of the at least one additional conductor and a second end of the first conductor is shorted to a second end of the at least one additional second conductor thereby forming a closed loop.

2. The system of claim 1 wherein the at least one additional conductor comprises two or more conductors.

3. The system of claim 1 wherein the first conductor and the at least one additional conductor comprise tape type conductors.

4. The system of claim 1 wherein the first conductor and the at least one additional conductor comprise superconductors.

5. The system of claim 4 wherein the first conductor and the at least one additional conductor comprise HTS tape type conductors.

6. The system of claim 1 wherein the longitudinal cut along the first conductor is configured to be a length of a half coil perimeter; and the longitudinal cut along the at least one additional conductor is configured to be a length of a half coil perimeter.

7. The system of claim 1 wherein the stack of the first conductor and the at least one additional conductor is impregnated with epoxy.

8. The system of claim 1 further comprising:

a ferromagnetic yoke wherein the closed loop is mounted in the ferromagnetic yoke.

9. The system of claim 1 further comprising:

a primary conducting coil; and a support structure configured to mount the primary conducting coil and the closed loop.

* * * * *